(12) United States Patent
Inoue et al.

(10) Patent No.: US 7,806,213 B2
(45) Date of Patent: Oct. 5, 2010

(54) PIPING STRUCTURE FOR TRANSPORTING A FUEL

(75) Inventors: Tomoki Inoue, Konan (JP); Masayuki Sasagawa, Kasugai (JP)

(73) Assignee: Tokai Rubber Industries, Ltd. (JP)

( * ) Notice: Subject to any disclaimer, the term of this patent is extended or adjusted under 35 U.S.C. 154(b) by 1279 days.

(21) Appl. No.: 11/304,379

(22) Filed: Dec. 15, 2005

(65) Prior Publication Data

US 2006/0131884 A1 Jun. 22, 2006

(30) Foreign Application Priority Data

| Dec. 17, 2004 | (JP) | ............................. 2004-366654 |
| Dec. 17, 2004 | (JP) | ............................. 2004-366656 |
| Dec. 17, 2004 | (JP) | ............................. 2004-366657 |
| Nov. 28, 2005 | (JP) | ............................. 2005-342039 |
| Nov. 28, 2005 | (JP) | ............................. 2005-342040 |

(51) Int. Cl.
*B60K 15/01* (2006.01)
(52) U.S. Cl. ........................................ 180/69.4; 285/33
(58) Field of Classification Search ................ 180/69.4; 285/33, 62; 248/74.2, 74.3, 68.1, 71
See application file for complete search history.

(56) References Cited

U.S. PATENT DOCUMENTS

| 4,966,398 A | * | 10/1990 | Peterson ..................... 285/319 |
| 5,163,215 A | * | 11/1992 | Ledford, Jr. .................. 29/468 |
| 5,772,160 A | * | 6/1998 | Gordon ..................... 248/68.1 |
| 5,797,675 A | * | 8/1998 | Tanner, Jr. ................... 362/396 |
| 5,937,911 A | | 8/1999 | Kodama et al. |
| 6,371,419 B1 | * | 4/2002 | Ohnuki ...................... 248/74.2 |
| 6,554,232 B1 | * | 4/2003 | Macris ........................ 248/71 |
| 6,779,763 B2 | * | 8/2004 | Miura et al. .................. 248/71 |
| 6,915,870 B2 | * | 7/2005 | Sugiyama et al. .......... 180/69.4 |
| 7,044,505 B2 | * | 5/2006 | Takayanagi .................. 285/93 |
| 7,219,931 B2 | * | 5/2007 | Kato ............................ 285/61 |
| 7,267,307 B2 | * | 9/2007 | Bauer .......................... 248/65 |
| 7,478,653 B2 | * | 1/2009 | Sakazaki et al. ............. 138/126 |
| 2005/0133010 A1 | * | 6/2005 | Yagisawa et al. ............ 123/468 |

(Continued)

FOREIGN PATENT DOCUMENTS

CN 1418302 5/2003

(Continued)

OTHER PUBLICATIONS

Toyota Motor Corporation; Example of fuel resin tubing by Toyota Motor Corporation; Sep. 5, 1996; pp. 1-6.

(Continued)

*Primary Examiner*—Jeffrey J Restifo
(74) *Attorney, Agent, or Firm*—Andrus, Sceales, Starke & Sawall, LLP

(57) ABSTRACT

A piping structure for transporting a fuel arranged between an engine and a fuel tank, is constructed by use of a resin tube that is formed in a straight tubular shape. The resin tube is flexed and bent at one or more points along a longitudinal direction of the resin tube to define one or more bent portions and thereby is provided with a predetermined bent shape. The resin tube is fixed in a motor vehicle body so as to retain the bent portions and thereby assembled in the motor vehicle body.

7 Claims, 30 Drawing Sheets

U.S. PATENT DOCUMENTS

| | | | | |
|---|---|---|---|---|
| 2006/0131884 A1* | 6/2006 | Inoue et al. | ................. | 285/420 |
| 2006/0134360 A1* | 6/2006 | Inoue et al. | .............. | 428/36.91 |
| 2007/0163546 A1* | 7/2007 | Yamanari | .................... | 123/456 |
| 2007/0200339 A1* | 8/2007 | Yagisawa et al. | .............. | 285/33 |
| 2007/0227605 A1* | 10/2007 | Sakazaki et al. | ............ | 138/109 |
| 2007/0227606 A1* | 10/2007 | Sakazaki | .................... | 138/121 |
| 2008/0230136 A1* | 9/2008 | Sakazaki et al. | ............ | 138/137 |

FOREIGN PATENT DOCUMENTS

| | | |
|---|---|---|
| CN | 1499071 | 5/2004 |
| CN | 1624315 | 6/2005 |
| EP | 0582301 | 2/1994 |
| EP | 0582302 | 2/1994 |
| JP | 5975983 | 5/1984 |
| JP | 647979 | 1/1989 |
| JP | 6455389 | 4/1989 |
| JP | 373779 | 7/1991 |
| JP | 579579 | 3/1993 |
| JP | 655693 | 3/1994 |
| JP | 640577 | 5/1994 |
| JP | 06-190913 | 7/1994 |
| JP | 06-221486 | 8/1994 |
| JP | 796564 | 4/1995 |
| JP | 7-46617 | 10/1995 |
| JP | 7-55192 | 12/1995 |
| JP | 868486 | 3/1996 |
| JP | 9217877 | 8/1997 |
| JP | 1122885 | 1/1999 |
| JP | 11-201355 | 7/1999 |
| JP | 11280958 | 10/1999 |
| JP | 2000513795 | 10/2000 |
| JP | 200138817 | 2/2001 |
| JP | 2002228066 | 8/2002 |
| JP | 2003176762 | 6/2003 |
| JP | 2004-251319 | 9/2004 |
| JP | 2004256080 | 9/2004 |
| JP | 2004324807 | 11/2004 |
| JP | 2005163738 | 6/2005 |
| JP | 2005180662 | 7/2005 |
| JP | 4144460 | 9/2008 |
| JP | 2004366656 | 4/2010 |

OTHER PUBLICATIONS

Sae International; Surface Vehicle Recommended Practice; Dec. 1997; pp. 1-20.
SAE International; Surface Vehicle Standard; No. 4; Nov. 1996; pp. 21-39.
Nitta Moore Co., TES Tubing Catalog; Jun. 2004; pp. 1-4.
English Abstract of JPU3-73779.

* cited by examiner

PIPING STRUCTURE FOR TRANSPORTING A FUEL

BACKGROUND OF THE INVENTION

1. Field of the Invention

The present invention relates to a piping structure for transporting a fuel, a resin tube for transporting a fuel adapted in the piping structure, and a method for producing the resin tube.

2. Description of the Related Art

Previously, a resin tube is used for transporting a fuel, for example, transporting a fuel in a fuel tank to an engine side.

The resin tube is connected to a mating pipe on a motor vehicle body side to constitute a piping system for transporting a fuel.

Previously, for connecting the resin tube with the mating pipe, a connector (quick connector) that permits simple and quick connection with the mating pipe has been used.

The connector of such type is disclosed, for example, in Patent Document 1 below. FIGS. 12 and 13 show an example of specific construction of the connector.

In FIGS. 12 and 13, reference numeral 200 indicates a resin tube, reference numeral 202 indicates a mating pipe to be connected with the resin tube 200.

The mating pipe 202 is formed with an engaging projection (pipe-side engaging portion) 204 projecting annularly on an outer peripheral surface thereof.

Reference numeral 206 indicates a connector that has a connector body (here, entirely made of resin) 208, a retainer 210, a bush 214 and O-rings 212 as sealing member.

The connector body 208 includes a retainer holding portion 216 on one end of the connector body 208 along an axial direction (a proximal end or an axially outer end of the connector body 208), and a press-fit portion (nipple portion) 218 on the other end thereof along the axial direction (a distal end or an axially inner end thereof) as connecting portion to the resin tube 200.

The press-fit portion 218 is a portion to be press-fitted or force-fitted within the resin tube 200 in an axial direction. The press-fit portion 218 is formed with annular ribs 220 at a plurality of axially spaced positions on an outer peripheral surface thereof. The annular rib 220 has a saw-edged cross-section and is provided with an acute angled peak.

The press-fit portion 218 is force-fitted within the resin tube 200 and thereby the connector body 208 is connected to such resin tube 200.

At that time, the annular ribs 220 formed on the outer peripheral surface of the press-fit portion 218 bite in an inner surface of an end portion of the resin tube 200 that is diametrically expanded and deformed by force-fitting of the press-fit portion 218, and thereby the resin tube 200 is retained and stopped for preventing withdrawal.

Meanwhile, the press-fit portion 218 is formed with an annular groove wherein an O-ring 222 is retained. The O-ring 222 provides an air-tight seal between the press-fit portion 218 and the resin tube 200.

The above retainer holding portion 216 is a portion for holding the retainer 210 while receiving the retainer 210 therein. The connector body 208 is connected to the mating pipe 202 via the retainer 210.

The retainer holding portion 216 is provided with a stop portion (body-side stop portion) 224 on a trailing end (proximal end or axially outer end) thereof for latching onto the retainer 210.

On the other hand, the retainer 210 is a resin member that is as a whole generally annular, and resiliently or flexibly deformable in a radial direction.

The retainer 210 is formed with an engaging recessed portion or engaging slit portion (retainer-side engaging portion) 225 and a latching recess (retainer-side latching portion) 226. The engaging projection 204 of the mating pipe 202 engages with the engaging recessed portion 225 from radially inward or inside the retainer 210. The latching recess 226 similarly fits to the stop portion 224 of the connector body 208 from radially inward or inside the retainer holding portion 216 to stop the retainer 210 in an axial direction.

The retainer 210 is held by the retainer holding portion 216 in an axially fixed state by latching the latching recess 226 onto the stop portion 224 of the retainer holding portion 216.

The retainer 210 further includes an inner peripheral surface thereof that defines a tapered inner peripheral cam surface 228, and an outer peripheral surface that defines a tapered outer peripheral cam surface 230.

When the mating pipe 202 is inserted inside the retainer 210 in an axial direction, the inner peripheral cam surface 228 abuts and guides the engaging projection 204 for further axial movement. Then the inner peripheral cam surface 228 resiliently diametrically expands the retainer 210 as a whole by the cam action as the engaging projection 204 moves and thereby allows passage of the engaging projection 204.

Then, as soon as the engaging projection 204 reaches a position of the engaging recessed portion 225, the retainer 210 as a whole returns to its original shape, the engaging projection 204 simultaneously is fitted or slipped in the engaging recessed portion 225 in fixed relation with one another in an axial direction.

On the other hand, when the retainer 210 is inserted in the retainer holding portion 216 of the connector body 208 in the axial direction, the outer peripheral cam surface 230 abuts the stop portion 224, thereby resiliently diametrically contracts the retainer 210 as a whole, and latches the latching recess 226 onto the stop portion 224 with diametrically contracting action of the retainer 210.

Meanwhile, the retainer 210 is provided with operation tabs 231 on trailing end portions (proximal end portions or axially outer ends, left end portions in the figure) thereof. The retainer 210 also may be diametrically contracted by exerting a radially inward force to the operation tabs 231.

In the connector 206, the retainer 210 is first held in the retainer holding portion 216 of the connector body 208. Then, in this state, the mating pipe 202 is inserted inside the retainer 210 in the axial direction.

During that time, the retainer 210 is resiliently expanded in a diametrically expanding direction by the engaging projection 204 of the mating pipe 202. As soon as the engaging projection 204 reaches the engaging recessed portion 225, the retainer 210 diametrically contracts and the engaging projection 204 engages in the engaging recessed portion 225.

On the other hand, the retainer 210 may be first attached to the mating pipe 202. Then, in this state, the mating pipe 202 with the retainer 210 thereon may be inserted in the connector body 208.

During that time, the retainer 210 diametrically contracts once, then, as soon as the latching recess 226 reaches a position of the stop portion 224, the retainer 210 diametrically enlarges to latch the latching recess 226 onto the stop portion 224.

The bush 214 and the O-rings 212 as sealing member are placed and retained in a distal end of the connector body 208 relative to the retainer holding portion 216. When the mating pipe 202 is inserted within the connector body 208, the O-rings 212 or the O-rings 212 and the bush 214 contact air-tightly with an inserting end portion 232 of the mating pipe 202, namely an outer peripheral surface of a leading end (axially inner end) of the inserting end portion 232 relative to the engaging projection 204 (an outer peripheral surface of a leading end portion of the inserting end portion 232 extending from the engaging projection 204), and provide an air-tight seal between the mating pipe 202 and the connector body 208.

As shown in FIG. 12 (A), two O-rings 212 are used in the connector 206. However, as shown in FIG. 12 (B), as the case may be, single O-ring 212 may be used in the connector 206 for compact sizing of the connector 206.

As understood from the above, the resin tube 200 may be easily connected with the mating pipe 202 by use of such connector 206 with a simple action.

By the way, such connector as described in Patent Document 2 may be used to be attached to an end portion of the resin tube 200. This connector 300 is, as shown in FIGS. 14 and 15, configured such that a relatively thin-walled retainer 302 is mounted on a retainer holding portion 304 in a direction perpendicular to an axis.

The connector 300 has a connector body (here, entirely made of resin) 306 in the form of a tubular shape as a whole, a retainer 302, O-rings 308 as sealing member and a bush 310 (refer to FIG. 14 (A)).

The connector body 306 includes a short cylindrical retainer holding portion 304 on one end of the connector body 306 along an axial direction and a connecting portion 312 on the other end thereof along the axial direction, for example, as connecting portion to the resin tube 200.

The retainer 302 in the form of a looped shape is configured by connecting a pair of engaging portions (retainer-side engaging portions, retainer-side latching portions) 314 integrally to V-shaped bodies 316 at one and the other ends of the engaging portions 314, respectively (refer to FIG. 14 (B). The retainer 302 is inserted in the retainer holding portion 304 via an opening 318 of the retainer holding portion 304 by narrowing a width of the retainer 302, and then the retainer 302 is returned to its original width (namely its original shape) in the retainer holding portion 304. The retainer 302 is located therein with its original shape.

When a mating pipe 202 (in the form of slightly different shape from the mating pipe 202 shown in FIG. 12) is inserted in the retainer 302, the engaging projection 204 of the mating pipe 202 abuts slant guide surfaces or slant guide cam surfaces 320 of the engaging portions 314. Then the engaging projection 204 pushes the slant guide cam surfaces 320 radially outwardly, and advances while widening the retainer 302. As soon as the engaging projection 204 passes through the engaging portions 314, the retainer 302 is slightly narrowed so that the engaging portions 314 engages with the engaging projection 204 in an axial direction (refer to FIG. 15). Here, the engaging portions 314 enter cutout portions (body-side stop portions) 322 of the retainer holding portions 304 and engage with the retainer holding portion 304 in the axial direction. In this manner, the mating pipe 202 and the retainer 302 or the connector body 306 are securely fixed in the axial direction. And, the mating pipe 202 may be pulled out of the connector 300 by pressing press portions 324 of the retainer 302 radially inwardly, and thereby widening a distance between the engaging portions 314. As shown in FIG. 16, in some case, enclosing portions 326 are formed in the opening 318 so as to rise radially outwardly in order not to allow the press portions 324 to protrude outwardly.

Or, a connector as shown in Patent Document 3 may be also used. This connector 400 is, as shown in FIGS. 17 and 18, configured such that a retainer 402 of a horse-shoe shape is mounted on a retainer holding portion 404 in a direction perpendicular to an axis. The connector 400 is provided further with a checker member 406 for verifying connection to the mating pipe 202.

The connector 400 has a connector body (here, entirely made of resin) 408 in the form of a cylindrical shape as a whole, a retainer 402, O-rings 410 as sealing member, a bush 412 and the checker member 406 (refer to FIGS. 17 and 18(B)).

The connector body 408 includes a short tubular retainer holding portion 404 on one end of the connector body 408 along an axial direction and a connecting portion 414 on the other end thereof along the axial direction, for example, as connecting portion to the resin tube 200.

The checker member 406 is shaped a box and includes a pair of resilient arms 416 and stop recesses 418 on end portions of the resilient arms 416. The checker member 406 is installed on an outer periphery of the retainer holding portion 404 in a direction perpendicular to an axis and is located in the retainer holding portion 404 so as to engage the stop recesses 418 with bottom surface portions 420, respectively.

The retainer 402 includes a pair of detecting lugs 422 and detecting detents 424 on end portions (free end portions) of the detecting lugs 422, and the detecting detents 424 protrude radially inwardly. The retainer 402 is mounted on an outer periphery of the retainer holding portion 404 in the direction perpendicular to the axis and is located in the retainer holding portion 404 so as to protrude the detecting detents 424 inside a passage of the engaging projection 204 of the mating pipe 202 (refer to FIG. 18 (A)).

When the mating pipe 202 is inserted in the connector body 408, the engaging projection 204 advances with pushing away slant guide surfaces or slant guide cam surface 425 and abuts the bush 412 (namely, the mating pipe 202 is correctly connected to the connector body 408), the detecting detents 424 of the retainer 402 are pushed and moved radially outwardly by the engaging projection 204, engagement of the detecting detents 424 and dents 430 of receiving slots 428 is cancelled, and thereby the retainer 402 is allowed to be further pushed in the direction perpendicular to the axis. When the retainer 402 is further pushed in the direction perpendicular to the axis, engaging portions (retainer-side engaging portions) 431 of the retainer 402 engage with the engaging projection 204 of the mating pipe 202, and simultaneously, the resilient arms 416 of the checker member 406 are moved by guide lugs 432 of the retainer 402, the stop recesses 418 of the resilient arms 416 are pushed radially outwardly, and thereby engagement of the stop recesses 418 and the bottom surface portions 420 is cancelled. In this manner, the mating pipe 202 and the connector body 408 are securely fixed together in the axial direction. In this securely fixed relation, the checker member 406 is allowed to separate from the connector body 408. That is, only when the mating pipe 202 is connected to the connector 400 correctly, the checker member 406 can be removed from the connector body 408. Meanwhile, the retainer 402 engages with restraining flanges 434, 436, 438 (body-side stop portions) of the connector body 404 at a rear end surface, middle recessed portions and a front end surface (retainer-side stop portions) of the retainer 402 in an axial direction.

The conventional resin tube 200 here is, for example, about 6 mm in an inner diameter and about 8 mm in an outer diameter, and adapted in a piping system as shown in FIG. 19.

In this piping system, a fuel in a fuel tank 234 is transported (supplied) by a fuel pump 236 through a supply channel 238 under a certain pressure, and injected from an injector 240 to a cylinder 242 of an engine. And, a surplus fuel is returned through a return channel 244 to the fuel tank 234. Preferably the piping and the resin tube as above is light-weight and has a small diameter in view of designing the piping system and cost-reduction.

Meanwhile, a resin tube for transporting a fuel, for example, the resin tube equipped with a connector is usually assembled in a motor vehicle body according to a predetermined piping layout. Conventionally, the resin tube is formed or molded as a whole initially in a required bent or curved shape (initially bent or curved resin tube) according to the predetermined piping layout in a formation or molding step of the resin tube. Then the initially bent or curved resin tube is delivered to an assembling site and assembled in the motor vehicle body on the assembling site.

However, the bent or curved resin tube that is formed or molded initially in the bent or curved shape is obtained, for example, in the following steps. A straight tubular resin tube is fitted in a constraining mold to is retain the resin tube in a bent or curved shape, and the resin tube as a whole or the constraining mold is put into an oven to be heated, for example, at a temperature of 150° C. to 160° C. for 20 to 30 minutes to be formed into a bent or curved shape, then the constraining mold is taken out from the oven, cooled, and the resin tube is removed out of the mold (for example, as disclosed in Patent Document 4 below). However, many production steps are required or exist in this production method, resulting in increase of the production cost. And, here, the resin tube corresponding to the type of a motor vehicle, strictly speaking, corresponding to the type of the piping layout is required, and varied types of the resin tubes should be produced accordingly. This is also a factor of the cost increase.

In the conventional structure for assembling a resin tube for transporting a fuel, the resin tube is initially formed or molded in a required bent or curved shape, and, for example, connected with the mating pipes on both ends of the resin tube by means of connectors. However, this causes the following problem besides the above problems.

When vibration is transmitted from a motor vehicle body through the mating pipe to the resin tube that is connected with the mating pipe via the connector, the resin tube relatively rotates relative to the mating pipe, together with the connector, and thereby the sealing member such as O-ring that is retained within the connector is worn and collapsed. As a result, such problem is caused that a sealing property is lowered.

Means for solving this problem are proposed in Patent Document 5 below. However, in this case, there still exists a problem that a particular, special connector and fixing clamp are required.

The problem as above notably occurs specifically in a vehicle wherein an engine is connected to a rear wheel so as to fluctuate along with the rear wheel, namely the vehicle wherein when the rear wheel oscillates or vibrates and fluctuate relative to a motor vehicle body or the frame, the engine also fluctuates relative to the motor vehicle body or the frame, following the rear wheel.

In a two-wheeled motor vehicle wherein an engine and a fuel tank are is arranged and fixed on the same frame, a resin tube equipped with a connector for transporting a fuel to the engine does not oscillate largely, and therefore, the above problem is not so notable. However, particularly in a two-wheeled motor vehicle where an engine fluctuates along with a rear wheel (for example, disclosed in Patent Documents 6 and 7 below), the above problem tends to be caused as a resin tube equipped with a connector is subject to increased oscillation and the resin tube oscillates largely.

[Patent Document 1] JP-A, 11-201355
[Patent Document 2] JP-B, 2641683
[Patent Document 3] JP-A, 2004-251319
[Patent Document 4] JP-A, 6-190913
[Patent Document 5] JP-A, 9-269088
[Patent Document 6] JP-Y, 7-55192
[Patent Document 7] JP-Y, 7-46617

SUMMARY OF THE INVENTION

Under the circumstances described above, it is an object of the present invention to provide a novel piping structure for transporting a fuel where a resin tube, which is produced in decreased number of steps at low cost, is used. In the piping structure, for example, the resin tube assembled in a vehicle body is stably held against vibration transmitted from the motor vehicle body. It is another object of the present invention to provide a novel resin tube that is adapted in the novel piping structure. And, it is yet another object of the present invention to provide a novel method for producing the novel resin tube that is adapted in the novel piping structure.

According to the present invention, there is provided a novel piping structure for transporting a fuel that is arranged between an engine and a fuel tank, or a novel structure for assembling a resin tube in a motor vehicle body. The resin tube is arranged between the engine and the fuel tank for transporting a fuel, and, for example, is equipped with a connector. The piping structure for transporting a fuel or the structure for assembling a resin tube comprises a resin tube for transporting a fuel that is formed in a straight tubular shape and a fixing clamp for fastening the resin tube to a motor vehicle body or fixing the resin tube in the motor vehicle body, and thereby assembling the resin tube in the motor vehicle body. The resin tube is flexed and bent or curved under flexibility of the resin tube at one or more points along a longitudinal direction of the resin tube, to define a bent portion or one or more bent portions and thereby the resin tube is provided with a predetermined bent shape, for example, as a whole. That is, the resin tube is in a form of a predetermined bent shape by bending and deforming the resin tube that is formed in the straight tubular shape under its flexibility. The fixing clamp securely fixes the resin tube or the bent portion in a motor vehicle body so as to retain the bent portion of the resin tube by clamping the resin tube or the bent portion. Here, as it is not necessary to form the resin tube in the predetermined bent shape at a production step of the resin tube, a cost required for the resin tube may be lowered. And, for example, the resin tube is in a form of a straight tubular shape until assembled in the motor vehicle body in an assembling step. The resin tube is provided with a predetermined bent shape, for example, a permanent predetermined bent shape and assembled in the motor vehicle in the step of assembling in the motor vehicle body. So, it is not necessary to prepare specific type of a resin tube for every different type of motor vehicle or for every different piping layout. It is advantageous that a common or same type of a resin tube may be used widely for various types of motor vehicles or various piping layouts.

To an end portion of the resin tube, a connector is attached for connecting the resin tube with a mating pipe, for example, before the resin tube is fastened to or fixed in the motor vehicle body. In this case, the resin tube is assembled in the motor vehicle body while being connected with the mating pipe via the connector or by means of the connector. For example, a relative rotational movement of the connector and the mating pipe is restrained by restraining action of the fixing clamp relative to the resin tube.

The fixing clamp may be arranged so as to retain the bent portion of the resin tube by fixing a region of each side of the bent portion of the resin tube in the motor vehicle body. This configuration allows to retain stably the resin tube in a form of bent shape. For example, the regions of both sides of the bent portion are clamped by the fixing clamps, respectively. And, as the regions of the both sides of the bent portion is securely fixed in the motor vehicle body, when vibration from the motor vehicle body is exerted to the resin tube, oscillation or vibration of the resin tube may be restrained small. Further, clamping or restraining action is also given to the resin tube by the fixing clamp, and thereby the resin tube itself does not rotate. So, for example, the connector does not relatively rotate relative to the mating pipe or, the resin tube does not relatively rotate along with the connector relative to the mating pipe. This may simultaneously solve the problem that the sealing member such as O-ring in the connector is worn and collapsed due to relative rotational movement of the resin tube relative to the mating pipe or relative rotational movement of the resin tube relative to the mating pipe along with the connector and thereby sealing property is lowered. So, good sealing property between the connector and the mating pipe may be maintained for a long time.

The fixing clamp may be a metal clamp.

The resin tube or the resin tube equipped with a connector that is adapted in the present invention is in a form of a straight tubular shape in a forming or molding step, and is provided with a predetermined bent shape when assembled in the motor vehicle body. This may lower the production cost.

Meanwhile, instead of a piping system (so-called a return fuel system) shown in FIG. 19, where a surplus fuel is returned to the fuel tank, another piping system, so-called retunless fuel system where a surplus fuel is not supplied but only a required quantity of the fuel, namely a quantity to be consumed is supplied from the fuel tank to the engine, has been increasingly applied recent years. In the returnless fuel system, only the required quantity of the fuel is supplied. Therefore, if the resin tube with the same diameter as in the piping system shown in FIG. 19 is used in the returnless fuel system, the fuel is likely accumulated. And, the fuel in accumulated state is evaporated in the piping under a certain atmosphere in the engine room, and resultantly, the engine revolutions are liable to be unstable. In this case, for the resin tube, a small-diameter resin tube, for example, of an outer diameter up to 6 mm (more preferably, up to 5 mm) is preferably used in order not to cause accumulation of the fuel. For so-called compact vehicle with a small engine such as a mini-vehicle, specifically, a two-wheeled motor vehicle, a three-wheeled motor vehicle, and all-terrain vehicle (ATV), it is preferable to use such small diameter resin tube or a small diameter resin tube with an inner diameter up to 4 mm, for example, a small diameter resin tube with an inner diameter up to 3.5 mm in order to prevent the fuel from being accumulated. Further, it is more preferable to use a small diameter resin tube with an inner diameter up to 3 mm, for example, a small diameter resin tube with an inner diameter up to 2.5 mm. Typically, the small diameter resin tube has high flexibility compared to a large diameter resin tube. Specifically, such small diameter resin tube is excellent in flexibility. Therefore, when such small diameter resin tube is bent or curved in the assembling step, the small diameter resin tube is hard to be broken (kinked). And, it is possible to assemble such small diameter resin tube in the motor vehicle body by bending and curving the small diameter resin tube in a predetermined bent shape without difficulty. Further, the small diameter resin tube is favorable in view of designing of piping system and low production cost.

The piping structure for transporting a fuel or the structure for assembling a resin tube according to the present invention may be preferably adapted in that the resin tube is connected via the connector with the mating pipe that is integrally formed in a component securely fixed in the motor vehicle body. Such mating pipe fixed in the motor vehicle body entails a problem that the resin tube easily relatively rotates relative to the mating pipe along with the connector due to oscillation of the motor vehicle body. However, according to the present invention, such relative rotation is effectively prevented and good sealing property may be maintained. And, the piping structure for transporting a fuel according to the present invention may be adapted for assembling of the resin tube in a motor vehicle wherein an engine is connected to or connected integrally to a rear wheel so as to fluctuate along with the rear wheel or so as to fluctuate integrally with the rear wheel, and in this case, the resin tube may be effectively prevented from oscillation or rotational movement.

The fixing clamp may be constructed to have a generally annular holding portion, and to have an opening through which the resin tube is fitted in the holding portion in a direction perpendicular to an axis, for example, before the resin tube is clamped. The fixing clamp is constructed such that the opening is closed when the fixing clamp is fixed in the motor vehicle body while holding the resin tube in the holding portion in order to assemble the resin tube in the motor vehicle body. The fixing clamp with such construction allows an operator to fix the resin tube in the motor vehicle body easily by means of the fixing clamp while bending the resin tube in an assembling site. At the same time, as the opening has been closed after the resin tube is fixed in the motor vehicle body by the fixing clamp, even if a great oscillating force acts on the resin tube, the resin tube and the fixing clamp are restrained from relative movement, and thereby a defect such as rubbing of the resin tube and the fixing clamp may be avoided.

The connector that is used here may have, a) a connector body, including a retainer holding portion on one end of the connector body along an axial direction and a connecting portion on the other end of the connector body for being connected to the resin tube, for example, in a form of a cylindrical shape as a whole, b) a retainer held in or on the retainer holding portion, for example, for engaging with a pipe side engaging portion in a form of a projection or recess on an outer peripheral surface of the mating pipe, and at a position spaced apart from an axial end of an inserting end portion of the mating pipe, and c) a sealing member placed, for example, inside the other end of the connector body relative to the retainer holding portion. For example, the retainer securely fixes the mating pipe or the inserting end portion of the mating pipe that is inserted in the connector body in an axial direction. The sealing member contacts with an outer peripheral surface of the mating pipe, or the inserting end portion of the mating pipe that is inserted in the connector body to provide a seal relative to the mating pipe or the inserting end portion thereof. And, the retainer holding portion may be configured in a form of a socket shape, and the connecting portion may be configured as a fit-in portion to be force fitted inside the resin tube. In this connector, the retainer is formed separately from the connector body or unitary with the connector body, and designed resiliently or flexibly deformable in a radial direction. The retainer may have a retainer-side latching portion. The retainer side latching portion fits to or latches onto a body-side stop portion that is formed on a side of retainer holding portion of a connector body from radially inward or inside the retainer holding portion to stop the retainer in the axial direction. The retainer further may have, at least one of an inner peripheral cam surface and an outer peripheral cam surface. The inner peripheral cam surface resiliently diametrically enlarges the retainer when the mating pipe is inserted in the retainer. On the other hand, the outer peripheral cam surface resiliently diametrically contracts the retainer when the retainer is inserted in the retainer holding portion.

Meanwhile, when the resin tube formed in a straight tubular shape is flexibly bent or deformed in a bent shape, and is assembled and securely fixed in the motor vehicle body by the fixing clamp, there is a fear that a scratch is created at a clamped part of the resin tube by the fixing clamp. And, when the resin tube has a scratch, there is another fear that deterioration of the resin tube progresses quickly. So, it is demanded that such scratch is not created on the resin tube when the resin tube is clamped by the fixing clamp. And, as the resin tube formed in a straight tubular shape is bent or deformed in various bent shapes for being assembled in the motor vehicle body, positioning of a part of the resin tube to be clamped or clamped by the fixing clamp is varied according to the bent shape of the resin tube. Accordingly, it is also demanded that no scratch is created on the resin tube whichever part of the resin tube is clamped by the fixing clamp.

According to the present invention there is also provided a novel resin tube for transporting a fuel that is used in the piping structure for transporting a fuel that is arranged between an engine and a fuel tank, or the structure for assembling a resin tube in a motor vehicle body. The resin tube is arranged between the engine and the fuel tank for transporting a fuel, and, for example, is equipped with a connector. The resin tube comprises a small diameter resin tube body with an outer diameter up to 6 mm, and an elastic clamped layer laminated on an outer side or outer peripheral surface of the resin tube body to be clamped by the fixing clamp. The elastic clamp layer has a predetermined wall thickness and covers the resin tube body along an entire effective length or entire effective portion of the resin tube that effects flexing deformation.

Here, a highly flexible resin tube is formed or molded in a straight tubular shape that has an outer diameter, for example, up to 6 mm and is suitably adapted mainly for a compact vehicle with a small engine, specifically a two-wheeled motor vehicle. The resin tube in a form of a straight tubular shape is flexibly bent or deformed in a bent shape when assembled in the motor vehicle body, and then assembled and securely fixed by the fixing clamp in the motor vehicle body. In the present invention, an elastic clamped layer with a predetermined wall-thickness is laminated on an outer side or an outer peripheral surface of the resin tube body along an entire effective length of the resin tube that effects flexing deformation of the resin tube, for being clamped by the fixing clamp. So, this clamped layer laminated on the outer side or the outer peripheral surface of the resin tube body effectively prevents creating a scratch on the resin tube body when the resin tube is clamped by the fixing clamp.

And, as the clamped layer is provided along a substantially entire length of the resin tube body, it may be effectively prevented to cause a scratch on the resin tube or resin tube body also in case where the resin tube is clamped at any or discretional points thereof by the fixing clamp. Therefore, an operator can assemble the resin tube in the motor vehicle body in a good state.

That is, according to the present invention, an operator can clamp by the fixing clamp any points of the resin tube along a longitudinal direction thereof without creating a scratch on the resin tube body, thereby can provide the resin tube with various bent shapes as desired, and assemble and pipe the resin tube.

Meanwhile, in an ordinary four-wheel motor vehicle, conventionally, as the case may be, a resin tube is covered with a protector made of rubber on an outer peripheral surface thereof.

However, in this case, the protector is provided for the purpose for protecting the resin tube from flying pebbles, and protecting or delaying the resin tube from melting in case of fire, etc. or the like.

It is not specifically demanded to provide the protector on the resin tube for transporting a fuel in a compact vehicle with a small engine, specifically two-wheeled motor vehicle wherein a small diameter tube with an outer diameter up to 6 mm is used.

In the present invention, the clamped layer of the resin tube is provided not for the purpose of protecting the resin tube from flying pebbles or fire, but resolutely for the purpose of protecting the resin tube from adverse affects by being clamped by the fixing clamp. Therefore, a wall-thickness of the clamped layer is decided according to this purpose.

For that purpose, in the present invention, the clamped layer preferably has a wall-thickness in a range of 0.7 to 1.3 mm. In the resin tube with the clamped layer of a wall thickness under 0.7 mm, it becomes difficult to protect sufficiently the resin tube body from suffering a scratch when the resin tube is clamped by the fixing clamp. In view of protecting the resin tube body from suffering a scratch, it is sufficient to form the clamped layer with a wall-thickness of 1.3 mm. On the contrary, in the resin tube with the clamped layer of a wall thickness above 1.3 mm, there is a fear that a problem is posed in flexing deformation of the resin tube into bent shape or fixing of the resin tube by the fixing clamp, etc., during assembling of the resin tube in the motor vehicle body.

By the way, when such clamped layer is provided so as to cover the resin tube along an entire length of the resin tube, specifically from one end to the other end of the tube body, a following problem arises.

When the resin tube is connected with the mating pipe via the connector, the resin tube is connected to the connector prior to assembling the resin tube in the motor vehicle body. The connector may include a tubular nipple portion as a force-fit portion to be force fitted in the resin tube, and the nipple portion is provided with an annular sealing member such as O-ring fitted on the outer peripheral surface thereof.

At that time, an end portion of the resin tube body is expanded in a flared shape (flared out) in order to force fit the nipple portion therein. However, the clamped layer, which covers the resin tube body to extreme ends of the resin tube body, overlies an end surface of a flared portion after the end portion of the resin tube body is flared out. And, when the nipple portion of the connector is force fitted inside the resin tube, a part of the clamped layer overlying the end surface of the flared portion could damage the sealing member such as the O-ring fitted on an outer peripheral surface of the nipple portion. Or the nipple portion could be force fitted inside the resin tube such that the part of the clamped layer overlying the end surface is caught in or jammed by the sealing member. As a result, there arises a fear that the sealing property between the nipple portion of the connector and the resin tube is lowered.

Therefore, preferably, the clamped layer is removed for a predetermined length from an extremity or opposite extremities of the resin tube body so as to expose an end portion or opposite end portions of the resin tube body. This configuration may solve the above-mentioned problem. That is, the clamped layer does not overlie the end surface of the flared portion when the end portion of the resin tube body is flared out. And, when the nipple portion of the connector is force fitted inside the resin tube, the sealing member such as O-ring fitted on the outer peripheral surface of the nipple portion is not damaged, and the end of the clamped layer is not caught in by the sealing member. As a result, solved is the problem that the sealing property is lowered.

In this configuration, the clamped layer is preferably removed for length of 2 to 8 mm from an extreme end (the extremity) or opposite extreme ends (the opposite extremities) of the resin tube body. That is, an end portion or opposite end portions of the clamped layer are removed for a length of 2 to 8 mm from the extremity or the opposite extremities of the resin tube body.

In the resin tube here, the clamped layer is first laminated or formed on the resin tube body so as to cover an entire length from one end to the other end thereof. Then, a generally cylindrical cutting guard is slid from a longitudinal end or each longitudinal end of the resin tube body and the clamped layer, namely from a longitudinal extremity or each longitudinal extremity thereof, between the resin tube body and the clamped layer, to protect or guard the resin tube body. And, the clamped layer is cut annularly near extreme end thereof or each extreme end thereof and an annular end portion or each of annular end portions of the clamped layer is removed from on the resin tube body by a cutting blade while protecting the resin tube body from being cut by the cutting guard. According to this production method of the present invention, an end portion or each end portion of the clamped layer may be removed favorably from an outer peripheral surface of the resin tube body for a predetermined length without damaging the resin tube body.

Meanwhile, the resin tube is formed or molded in a straight tubular shape, and is fastened to or fixed in the motor vehicle body by the fixing clamp while being flexibly bent or deformed into a bent shape at assembling the resin tube in the motor vehicle body. In this case, the flexible resin tube tends to be kinked due to its flexibility. However, it is difficult for an operator to find that the resin tube is kinked, and there is a fear that the resin tube is assembled in the motor vehicle body by the operator while kinked.

In this case, there could be an obstacle in transporting a fuel. Or there is caused a problem that kink of the resin tube causes a large stress in the resin tube and the resin tube tends to be deteriorated at a location of the stress generated.

Further, there is also a fear that due to the stress generated, the mating pipe contacts partially with the sealing member such as O-ring that is fitted in the connector, and thereby the sealing property is lowered.

The above explanation is based on a typical instance of a small diameter tube. However, such problems could arise commonly in a case where a resin tube is formed or molded in a straight tubular shape, and is fastened to or fixed in a motor vehicle body by the fixing clamp while being flexibly bent or deformed in a bent shape in an assembling of the resin tube in the motor vehicle body.

It is required that the resin tube is prevented from being assembled in the motor vehicle body while kinked, or the resin tube is not subject to unreasonable distortion that accelerates deterioration of the resin tube. And it is also required that assembling of the resin tube does not result in kink of the resin tube or partial contact between the mating pipe and the sealing member of the connector, and thereby in lowered sealing property. So, there is a demand for such resin tube to meet the foregoing requirements.

According to the present invention there is provided another novel resin tube for transporting a fuel that is used in the piping structure for transporting a fuel that is arranged between an engine and a fuel tank, or the structure for assembling a resin tube in a motor vehicle body. The resin tube is arranged between the engine and the fuel tank for transporting a fuel, and, for example, is equipped with a connector. The resin tube is provided with a mark on an outer peripheral surface of the resin tube, along a generally entire length or along an entire length of the resin tube. The mark extends linearly in a longitudinal direction of the resin tube in a state that the resin tube extends straight. With this resin tube with the mark thereon, when the resin tube is kinked during assembling in the motor vehicle body, a kink is produced in the mark arranged linearly as well as in the resin tube itself, and an operator can easily and visually verify by the mark that a kink is produced in the resin tube.

So, the operator can arrange and assemble the resin tube without producing a kink in the resin tube by maintaining a linear arrangement of the mark on the resin tube.

This configuration produces a major effect when adapted specifically to a small diameter resin tube with an outer diameter up to 6 mm, and to a resin tube that is to be connected with the mating pipe via a connector which is rotatable relative to the mating pipe and includes an annular sealing member such as an O-ring to provide a seal relative to the mating pipe.

More specifically, in case where a connector is attached to an end portion of a resin tube for connecting the resin tube with the mating pipe, and the connector is provided with a checker member for verifying complete connection with the mating pipe, for example, the mark is provided on the resin tube so as to correspond to, conforming to or generally conform to a mounting and removing direction of the checker member, or the mounting and removing side of the checker member relative to a circumferential position. Or, the mark may be provided on the resin tube so as to correspond to, conform to, or generally conform to a diametrically opposite side to the mounting and removing direction of the checker member or the mounting and removing side of the checker member relative to a circumferential position.

Or, in case where a connector is attached to an end portion of a resin tube for connecting the resin tube with the meting pipe, and the connector is provided with a retainer for engaging with the mating pipe, the retainer has an operating portion that does not project radially from the connector, the operating portion is configured so as to cancel engagement of the mating pipe with the connector or with the retainer by being operated, for example, the mark is provided on the resin tube so as to correspond to, conform to or generally conform to the operating portion or an operating direction of the operating portion relative to a circumferential position.

Now, the preferred embodiments wherein the present invention is adapted for an assembling structure of a resin tube equipped with a connector to be arranged between an engine and a fuel tank in a compact vehicle for transporting a fuel will be described in detail with reference to the drawings.

Here, the compact vehicle means specifically a two-wheeled motor vehicle, a three-wheeled motor vehicle, and all-terrain vehicle (ATV) or the like, or a mini-vehicle.

BRIEF DESCRIPTION OF THE DRAWINGS

FIG. 1 (B) is an enlarged view of a part B of FIG. 1 (A).

FIG. 1 (C) is another enlarged view of the part B of FIG. 1 (A).

FIG. 2 (B) is a sectional view showing a state that a resin tube is connected with a mating pipe by means of the connector.

FIG. 4 (B) is a sectional view taken along B-B line of FIG. 4 (A).

FIG. 4 (C) is an enlarged view of a part C of FIG. 4 (A).

FIG. 4 (D) is a view showing an example of providing the resin tube with a mark.

FIG. 6 (B) is a sectional view showing that the resin tube is fastened by the fixing clamp.

FIG. 7 (B) is a sectional view showing the another mode of the fixing clamp.

FIG. 7 (C) is a sectional view of a buffer member that is used in the another mode of the fixing clamp.

FIG. 7 (D) is another sectional view of the buffer member.

FIG. 8 (B) is a sectional view showing a state that the resin tube is fastened by the another mode of the fixing clamp.

FIG. 8 (C) is a view showing a piping structure where the another mode of the fixing clamp is used.

FIG. 8 (D) is an enlarged view showing a part D of FIG. 8 (C).

FIG. 10 (B) is a view showing a second step of the production process of the resin tube of the one embodiment.

FIG. 10 (C) is a view showing a third step of the production process of the resin tube of the one embodiment.

FIG. 10 (D) is a view showing a fourth step of the production process of the resin tube of the one embodiment.

FIG. 10 (E) is a view showing a fifth step of the production process of the resin tube of the one embodiment.

FIG. 11 (B) is a view showing a second step of the production method by way of comparison to the production process shown in FIG. 10.

FIG. 11 (C) is a view showing a third step of the production method by way of comparison to the production process shown in FIG. 10.

FIG. 12 (B) is a view of a connector shown in FIG. 12 (A), where exact one O-ring is used.

FIG. 13 (B) is a view of the relevant part of the connector of FIG. 12 along with the resin tube, and showing a state that the connector is force-fitted in the resin tube.

FIG. 14 (B) is a view showing a retainer of the another connector.

FIG. 18 (B) is a view showing that the yet another connector is connected to the mating pipe.

DETAILED DESCRIPTION OF THE PREFERRED EMBODIMENTS

Figure 2A:
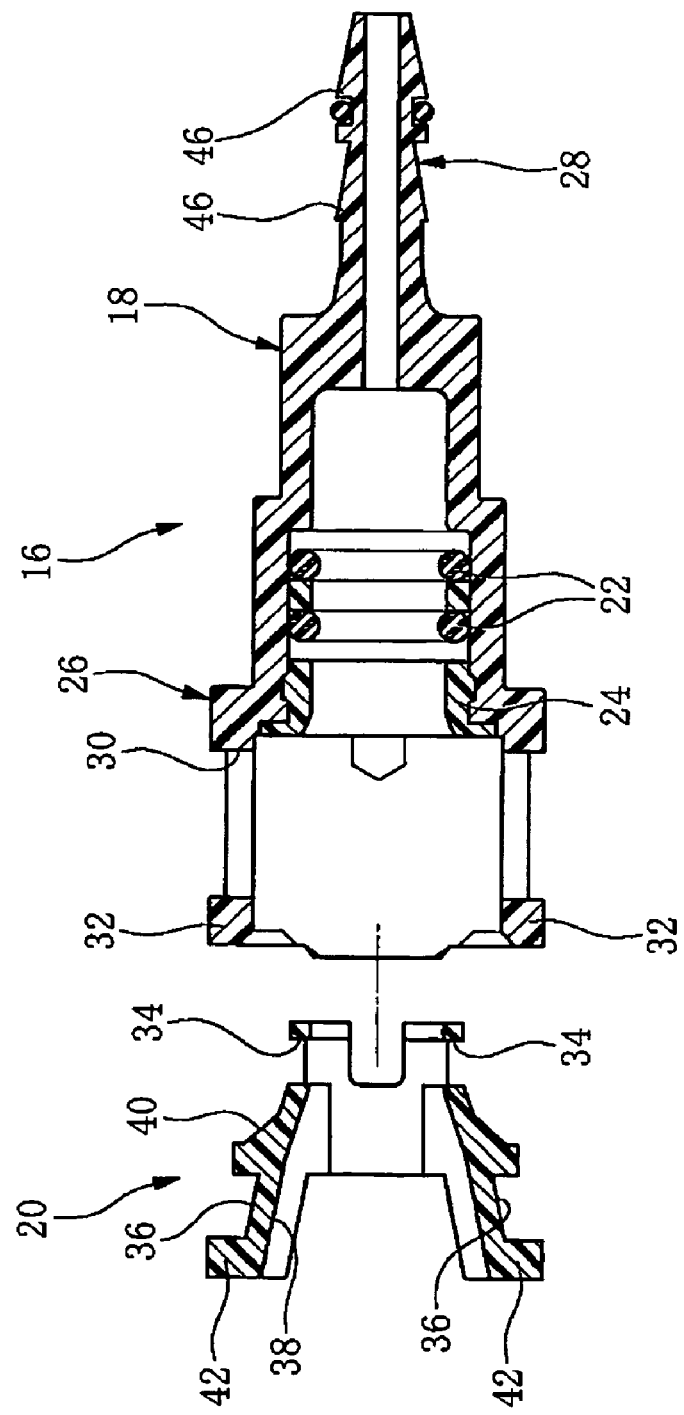
FIG. 2 (A) is a partly exploded sectional view of a connector of the one embodiment.
Figure 2B:
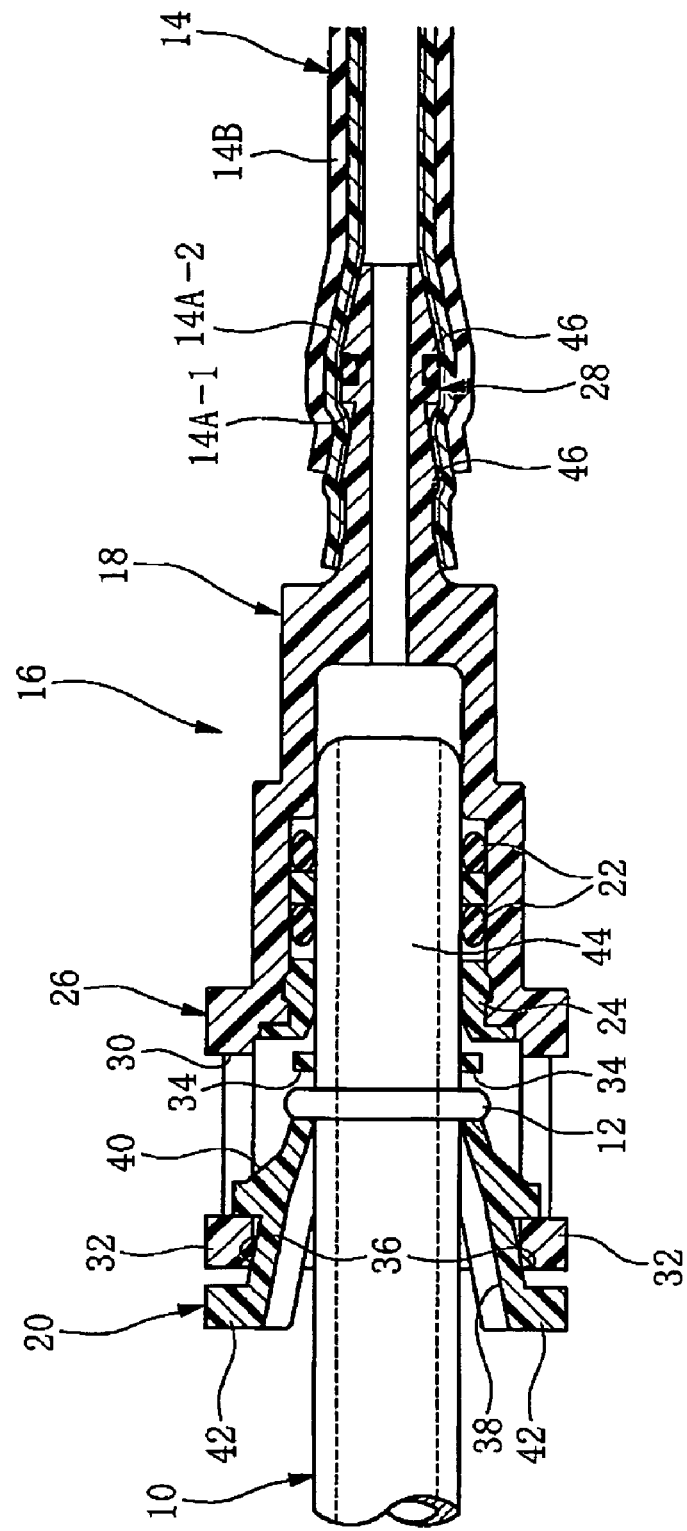
Figure 3:
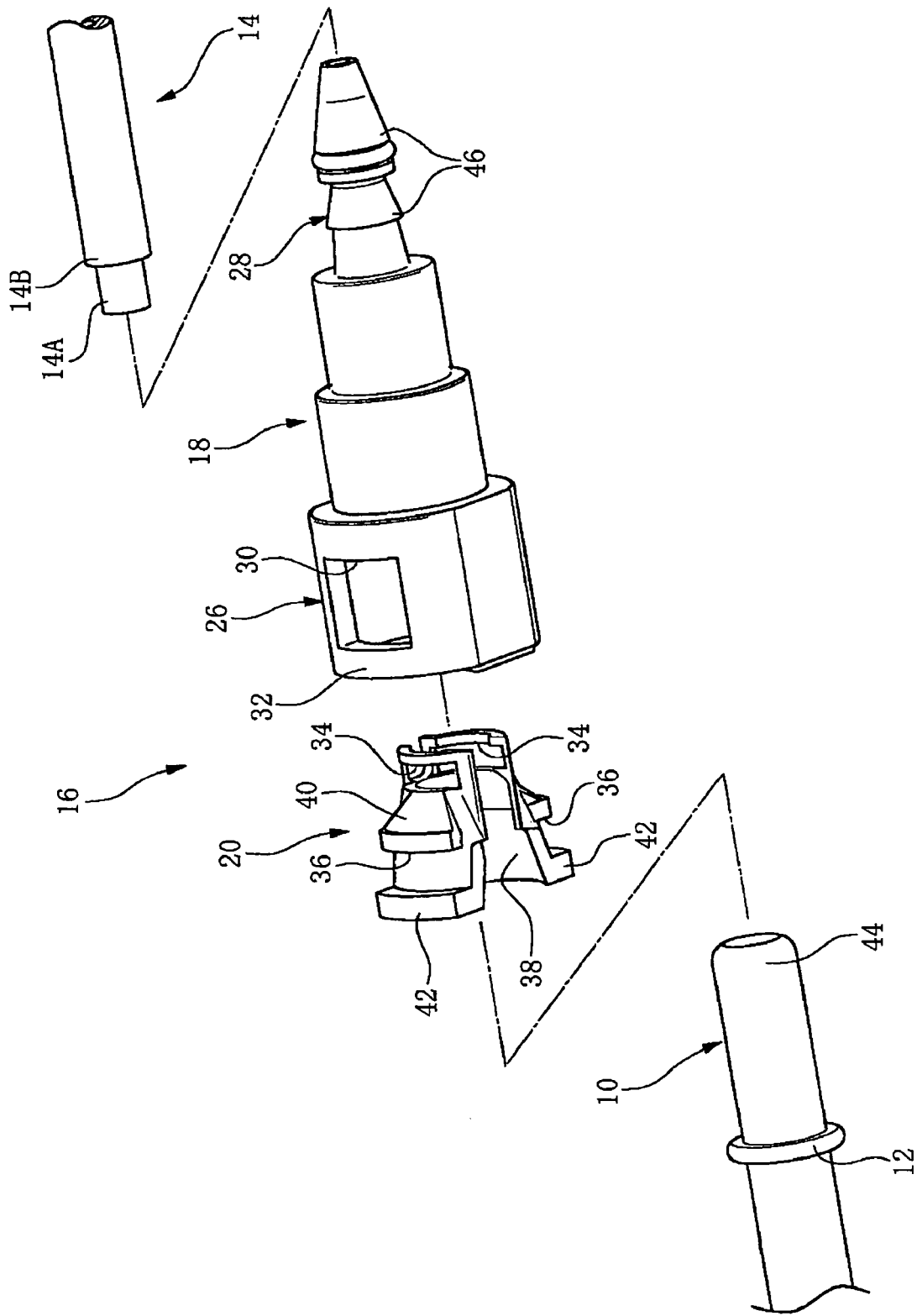
FIG. 3 is a partly exploded perspective view showing the connector along with a mating pipe.
Figure 4A:
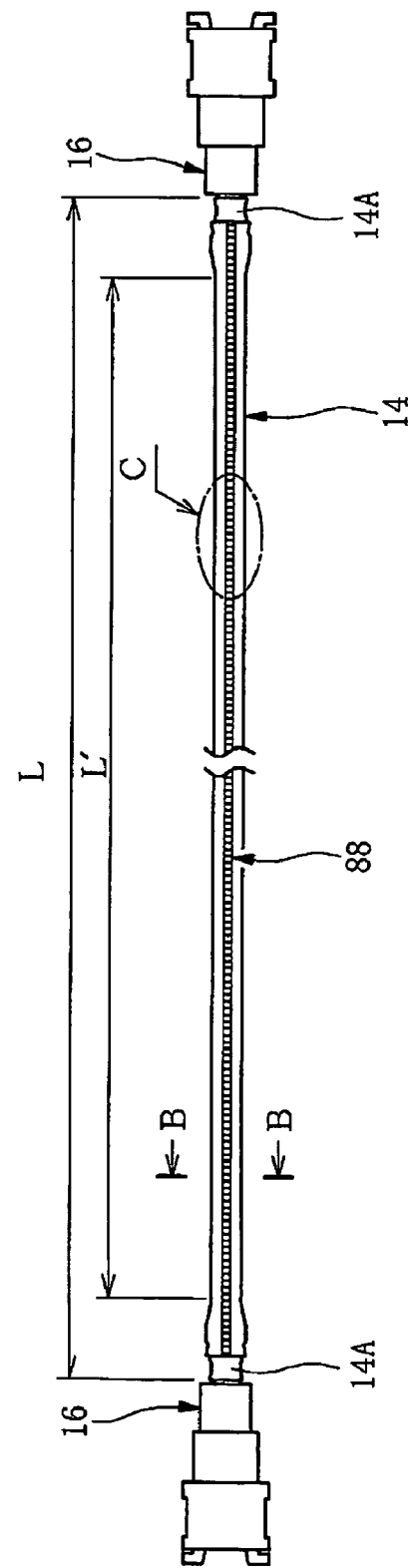
FIG. 4 (A) is a front view showing the resin tube equipped with the connector of the one embodiment, before assembled in a motor vehicle.
Figure 4B:
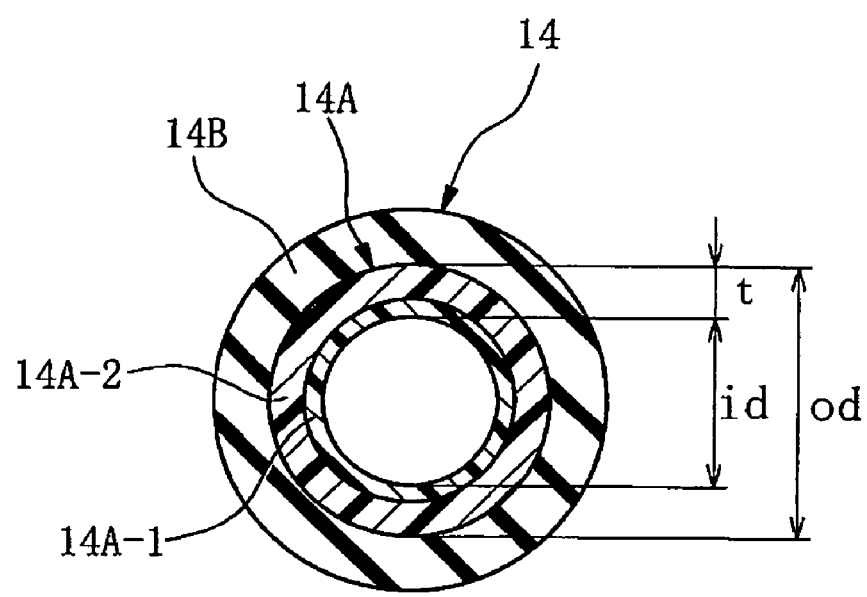
Figure 4C:
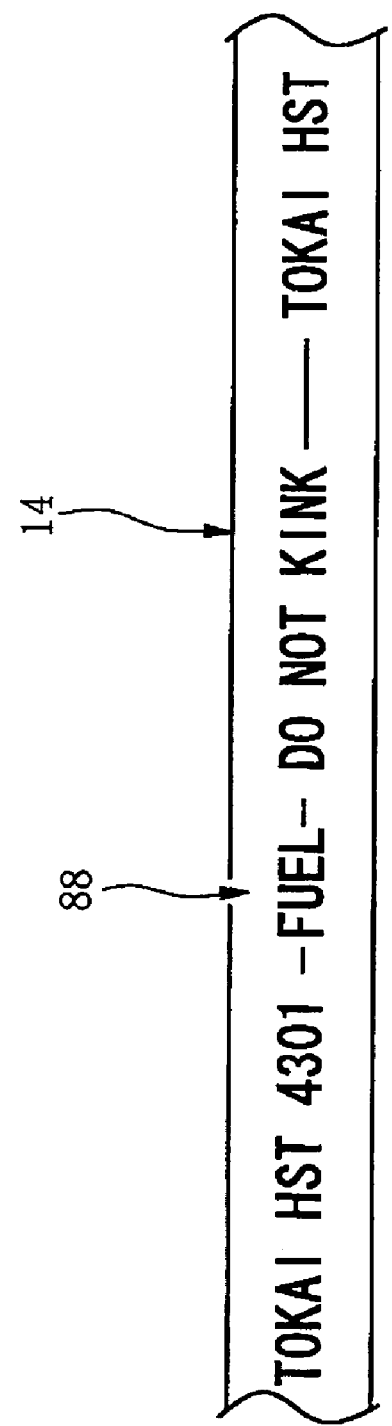
Figure 4D:
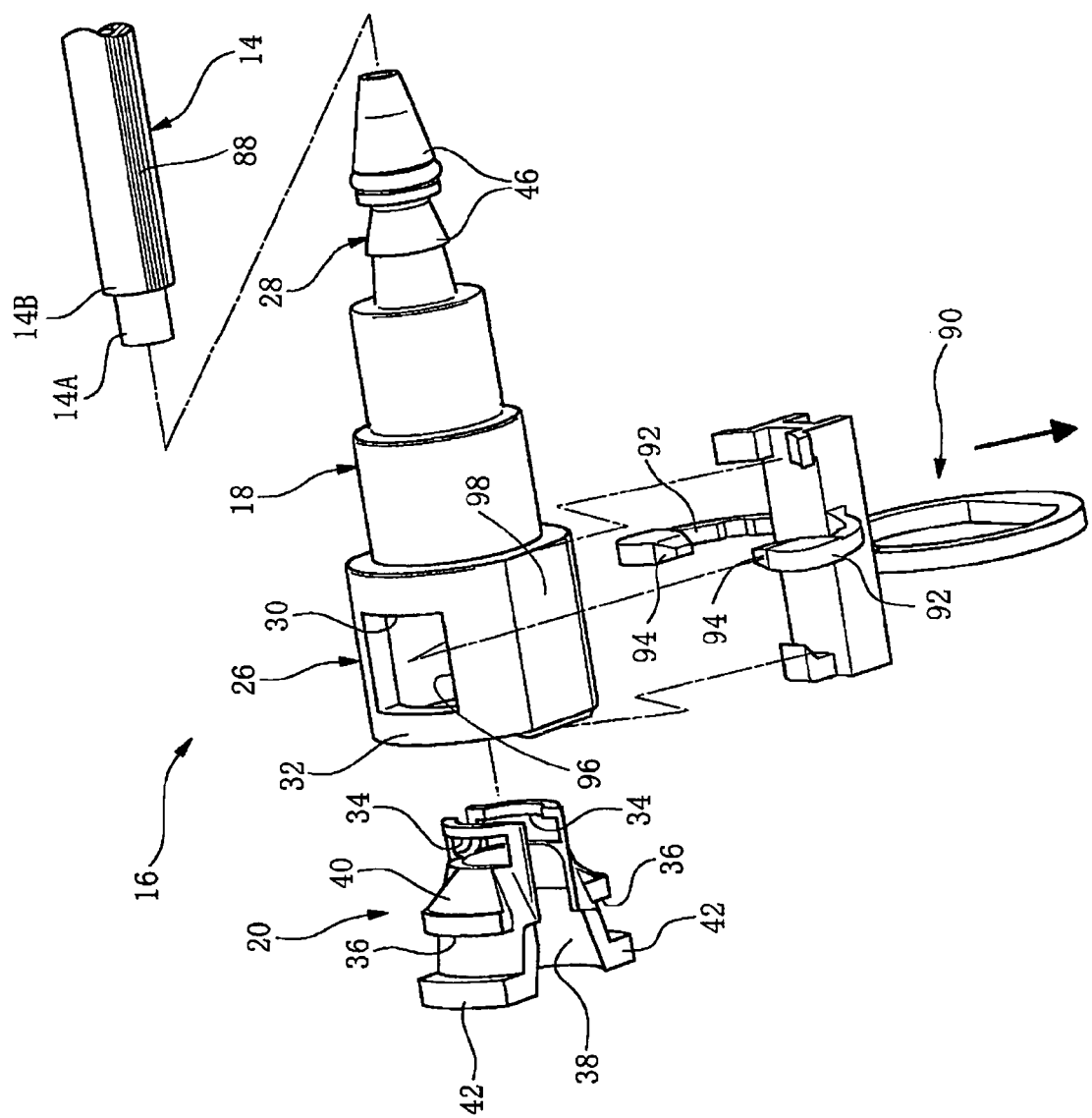

With reference to FIGS. 2 and 3, reference numeral 10 is a mating pipe that is formed integrally to a component such as an engine or a fuel tank securely fixed to a motor vehicle body. The mating pipe 10 is formed with an engaging projection (pipe-side engaging portion) 12 projecting annularly on and around an outer peripheral surface thereof.

FIG. 4 shows a resin tube equipped with a connector to be arranged between an engine and a fuel tank in a state before assembled in the motor vehicle body. In Figures, reference numeral 14 indicates the resin tube, reference numeral 16 indicates the connector (quick connector). The connectors 16, 16 are attached to both end portions of the resin tube 14. However, when the resin tube 14 is connected directly to a mating member such as the mating pipe 10 on one end portion of the resin tube by force-fitting or the like, the connector 16 is attached only to the other end portion of the resin tube 14.

Here, the resin tube 14 has a straight tubular shape before assembled in or to the motor vehicle body. That is, the resin tube 14 is formed or molded in the straight tubular shape.

Meanwhile, the resin tube 14 equipped with the connector 16 is adaptable for a returnless fuel system where a surplus fuel is not returned to the fuel tank and for another fuel system where a surplus gasoline is returned to the fuel tank (return fuel system).

As shown in FIG. 4 (B), reference numeral 14A is a resin tube body of the resin tube 14. The resin tube body 14A has a multilayered construction that includes an inner layer 14A-1 made of ETFE and an outer layer 14A-2 made of PA 12.

Further, a clamped layer or to-be-clamped layer 14B is laminated on an outer peripheral surface of the resin tube body 14A so as to cover the resin tube body 14A along an entire effective length thereof that effects flexing deformation, specifically, along an entire length of the tube body 14A except for the both end portions of the resin tube body 14A. The effective length is indicated by L', shorter than an entire length L of the resin tube 14. The effective length L' is, for example, a length of the resin tube 14 except for both end portions in which a nipple portion 28 (to be described later) of the connectors 16 are fitted. Here, the clamped layer 14B is formed slightly longer than the effective length L'. That is, in this embodiment, the clamped layer 14B is also laminated on a part or inner part of a region of the resin tube body 14A in which the nipple portion 28 of the connector 16 is force fitted, namely, the part or inner part of the region of the resin tube body 14A that is fitted on the nipple portion 28.

Concretely, the resin tube body 14A is entirely covered with the clamped layer 14B except at regions extending for a distance δ from both extremities of the resin tube body 14A in axially inward direction. In this embodiment, the distance δ is equal to 2 to 8 mm.

Here, the clamped layer 14B is provided for being clamped by a fixing clamp which will be described later.

In this embodiment, the resin tube body 14A is a small diameter tube that has an inner diameter (id) of 2.5 mm, an outer diameter (od) of 4 mm. Namely, the inner layer 14A-1 has an inner diameter (id) of 2.5 mm, and the outer layer 14A-2 has an outer diameter (od) of 4 mm.

Here, the inner layer 14A-1 has a wall thickness of 0.2 mm, the outer layer 14A-2 has a wall thickness of 0.55 mm, and the clamped layer 14B has a wall thickness of 1.0 mm. That is, wall thickness (t) of the inner layer 14A-1 and the outer layer 14A-2, namely a wall thickness (t) of the resin tube body 14A is 0.75 mm.

The resin tube 14 is designed to have the entire length-L of 200 to 1500 mm.

However, the multilayered construction, material and dimension such as wall thickness and length are given by way of example. Needless to say, these may be modified variously.

As shown in FIG. 2, the connector 16 has a connector body (here, entirely made of resin) 18 of a tubular shape as a whole, a retainer 20, a bush 24 and O-rings 22, 22 as sealing member (also refer to FIG. 3). For example, the O-ring 22 functions as sealing member, while the bush 24 functions not as sealing member but as stop against lateral wobbling with respect to an axis.

In this embodiment, the connector 16 is made of PA (except the sealing member). However, the material for the connector 16 is selectable suitably in view of heat resistance, fuel impermeablity, gasoline resistance (resistance to swelling in gasoline) and cost.

Specifically, polyamide type (PA11, PA12, P6, PA66, polyphtalamide (PPA), etc.) and polyphenylene sulphide (PPS) or the like are excellent in heat resistance, and polyester type (polybutylene terephthalate (PBT), polyethylene terephthalate (PET), polyethylene naphthalate (PEN), etc.) is excellent in fuel impermeability and resistance to gasoline.

And, polyacetal (POM) is available at relatively low cost while securing heat resistance, fuel impermeability, and resistance to gasoline.

And, glass fiber may be added in the above materials to enhance strength or nanocomposite material such as clay may be added in the above materials to improve the fuel impermeability.

These materials are also suitable for a material for the resin tube body 14A. For the material of the resin tube 14 or the resin tube body 14A, an alloy of elastomer and one of these resin materials may be used. Such alloy may provide the resin tube 14 or the resin tube body 14A with flexibility in addition to heat resistance and fuel impermeability inherent in resin itself.

The above connector body 18 has a socket like retainer holding portion 26 on an proximal end thereof and a press-fit or force-fit portion (nipple portion) 28 on a distal end thereof as a connecting portion to the resin tube 14, as shown in FIG. 2.

The retainer holding portion 26 is a portion for receiving and holding the retainer 20 therein. The connector body 18 is connected to the mating pipe 10 via the retainer 20.

The retainer holding portion 26 is formed with a pair of opening windows 30, 30 and stop portions (body-side stop portions) 32, 32 on a trailing end thereof for being latched in the retainer 20. The pair of the opening windows 30, 30 are disposed in a diametrically symmetrical positions with each other.

And, the retainer 20 is a member of generally annular shape (here, C-shape in section) as a whole and made of resin. The retainer 20 is designed resiliently and flexibly deformable in a radial direction.

The retainer 20 has engaging recessed portions or engaging slit portions (retainer-side engaging portions) 34, 34 and latching recesses (retainer-side latching portions) 36, 36. The engaging projection 12 of the mating pipe 10 engages with the engaging recessed portion (retainer-side engaging portion) 34 from radially inward or inside the retainer 20 to be securely fixed in an axial direction, while the latching recess 36 similarly fits to or latches onto the stop portion 32 of the connector body 18 from radially inward or inside the retainer holding portion 26 to stop the retainer 20 in the axial direction.

The retainer 20 is held by the retainer holding portion 26 in fixed relation in the axial direction while latching the latching recess 36 onto the stop portion 32 of the retainer holding portion 26.

The retainer 20 further includes an inner peripheral surface that defines a tapered inner peripheral cam surface (a tapered inner peripheral guide surface or a tapered inner peripheral abutment surface) 38, and an outer peripheral surface that defines a tapered outer peripheral cam surface (a tapered outer peripheral guide surface or a tapered outer peripheral abutment surface) 40.

The inner peripheral cam surface 38 abuts the engaging projection 12, and guides the engaging projection 12 for axial movement when the mating pipe 10 is inserted inside the retainer 20 in the axial direction. As the engaging projection 12 moves, the inner peripheral cam surface 38 resiliently diametrically enlarges the retainer 20, for example, as a whole under camming action or guiding action so as to allow passage of the engaging projection 12.

Then, as soon as the engaging projection 12 reaches a position of the engaging recessed portion 34, the retainer 20 returns to its original shape as a whole, and simultaneously, the engaging projection 12 is fitted in the engaging recessed portions 34, 34 in fixed relation with one another in an axial direction.

On the other hand, when the retainer 20 is inserted in the retainer holding portion 26 of the connector body 18 in the axial direction, the outer peripheral cam surface 40 abuts the stop portions 32, 32, thereby resiliently diametrically contracts the retainer 20, for example, as a whole, and finally latches the latching recesses 36, 36 onto the stop portions 32, 32, respectively.

The retainer 20 includes operation tabs 42, 42 on trailing end portions (proximal end portions or axially outer ends) thereof. The retainer 20 may also be diametrically contracted by exerting a force to the operation tabs 42, 42 radially inwardly.

In the connector 16, the retainer 20 is first held in the retainer holding portion 26 of the connector body 18, and in this state, the mating pipe 10 is inserted inside the retainer 20 in the axial direction.

During that time, the retainer 20 is resiliently expanded in a diametrically expanding direction by the engaging projection 12 of the mating pipe 10. And, as soon as the engaging projection 12 reaches the engaging recessed portions 34, 34, the retainer 20 diametrically contracts and the engaging projection 12 engages in the engaging recessed portion 34.

Alternatively, the retainer 20 is first attached to the mating pipe 10, and in this state, the mating pipe 10 with the retainer 20 thereon may be inserted in the connector body 18.

At that time, the retainer 20 once diametrically contracts, and then, as soon as the latching recess 36 reaches a position of the stop portion 32, the retainer 20 diametrically expands and the latching recess 36 latches onto the stop portion 32.

The bush 24 and the above O-rings 22, 22 as the sealing member are equipped and held inside a distal end or leading end of the connector body 18 relative to the retainer holding portion 26. As soon as the mating pipe 10 is inserted in the connector body 18, the O-rings 22, 22 or the O-rings 22, 22 and the bush 24 contact air-tightly with an inserting end portion 44 of the mating pipe 10, namely an outer peripheral surface of a leading end of the inserting end portion 44 relative to the engaging projection 12 (or an outer peripheral surface of a leading end of the mating pipe 10 extending from the engaging projection 12 in a leading direction (traveling direction) of the mating pipe 10) to provide an air-tight seal between the mating pipe 10 and the connector body 18.

The force-fit portion 28 is a portion to be force fitted or press fitted inside the resin tube 14 in the axial direction. The force-fit portion 28 is formed with annular ribs 46 at a plurality of axially spaced positions (here, two positions) on an outer peripheral surface thereof. The annular rib 46 has a saw-edged cross-section and is provided with an acute angled peak.

The connector body 18 is stopped relative to the resin tube 14 by force fitting the force-fit portion 28 in an end of the resin tube 14. Meanwhile the connector body 18 may be stopped relative to the resin tube 14 by other means than force fitting, for example, such as welding and overmolding.

Figure 1A:
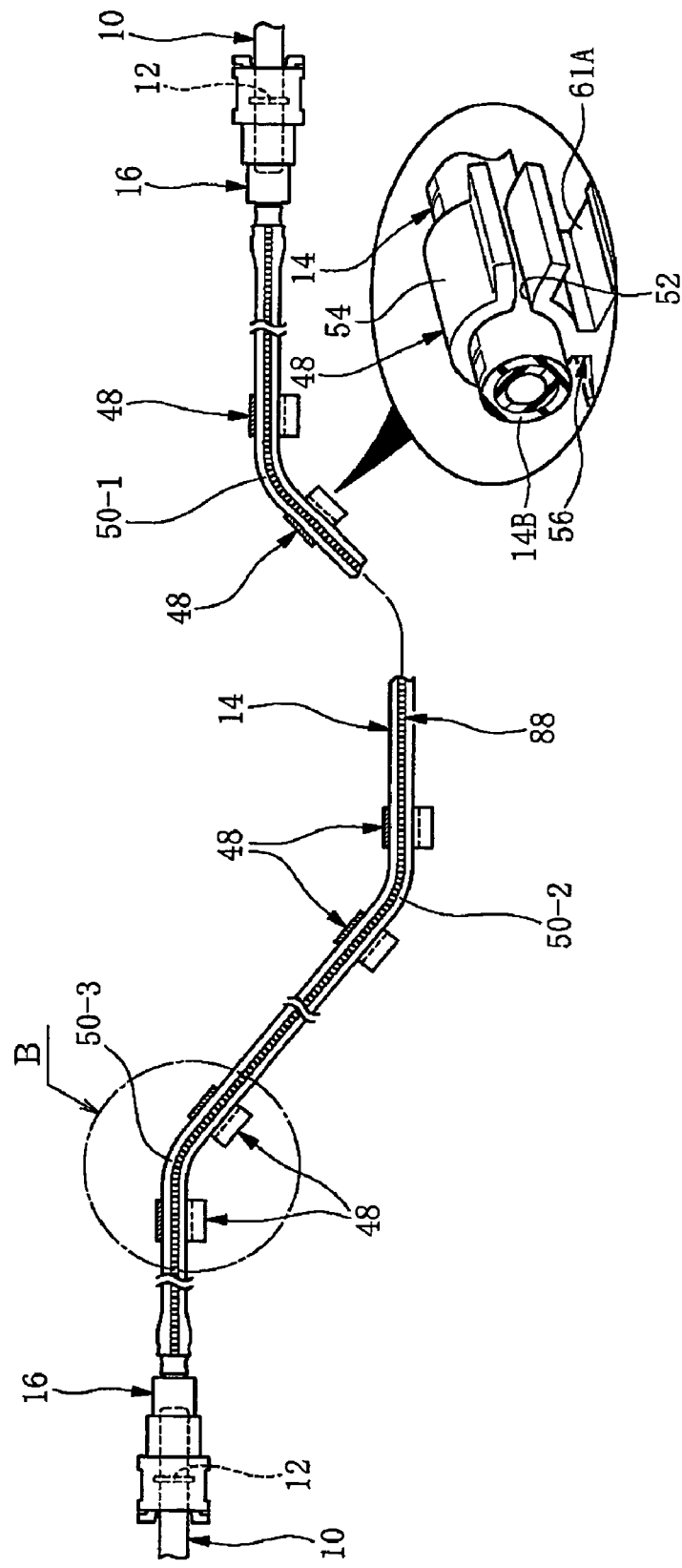
FIG. 1 (A) is a view showing a piping structure for transporting a fuel according to one embodiment of the present invention.
Figure 1B:
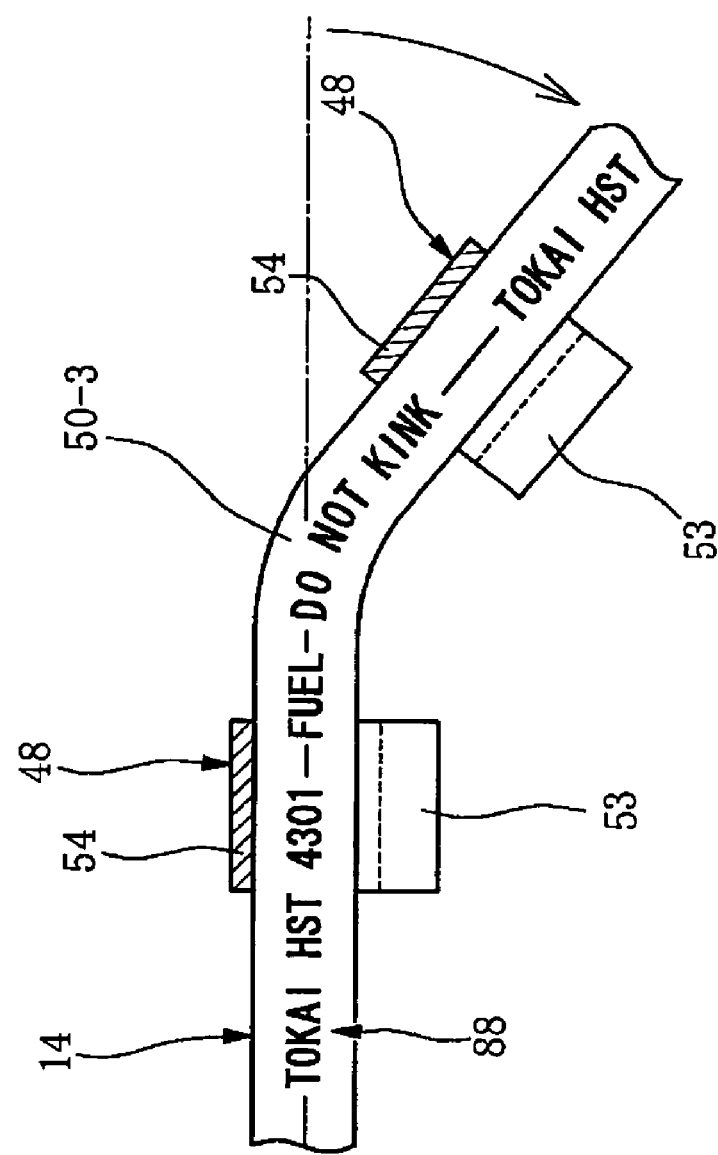
Figure 1C:
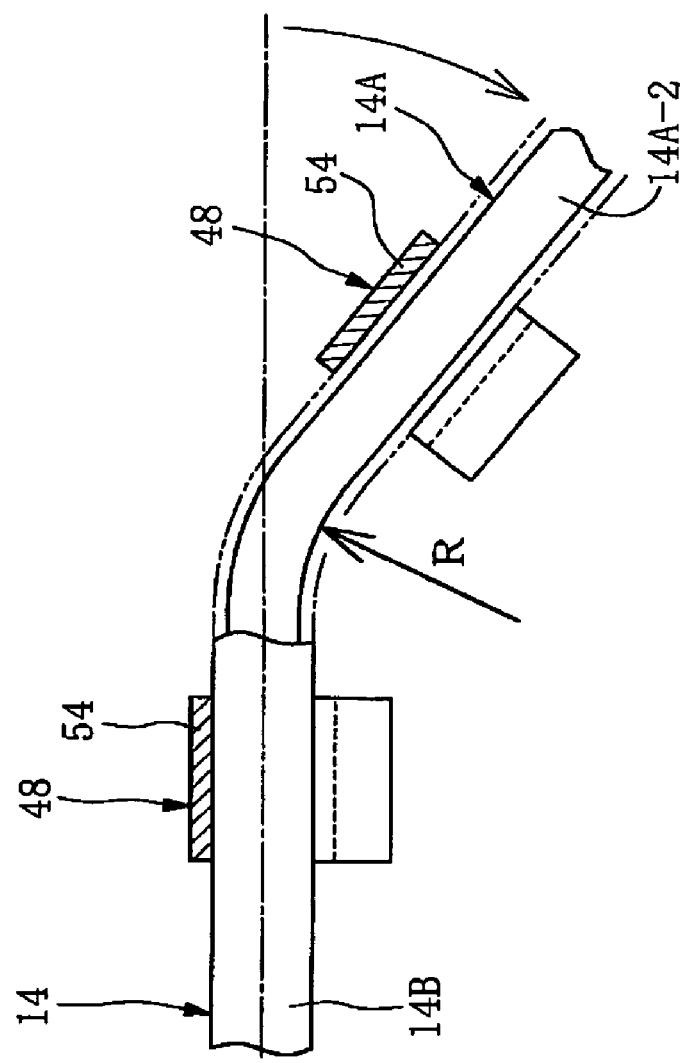

FIGS. 1 (A) and 1 (B) show a state that the above resin tube 14 equipped with the connector 16 is assembled in a motor vehicle body.

As shown in the figures, here, the resin tube 14 is bent or curved in arcuate shape at a plurality of points (here, three bent points 50-1, 50-2, 50-3) along a longitudinal direction based on its flexibility. Both side portions of each of the plurality of the bent points 50-1, 50-2, 50-3 are held and fastened to the motor vehicle body by fixing clamps.

In this manner, the resin tube 14 equipped with connectors 16, 16 is entirely provided with bends or bent portions as predetermined. And the resin tube 14 in this state is assembled in the motor vehicle body while being connected with the mating pipes 10 via the connectors 16, 16.

That is, the resin tube 14 that is formed in straight tubular shape is arranged and assembled in the motor vehicle body while being restrained and retained in bent shape as desired by the fixing clamp.

Namely, the resin tube 14 formed in a straight tubular shape is arranged and assembled in the motor vehicle body in a bent shape as desired under restraining and constraining force by the fixing clamp.

Figure 5:
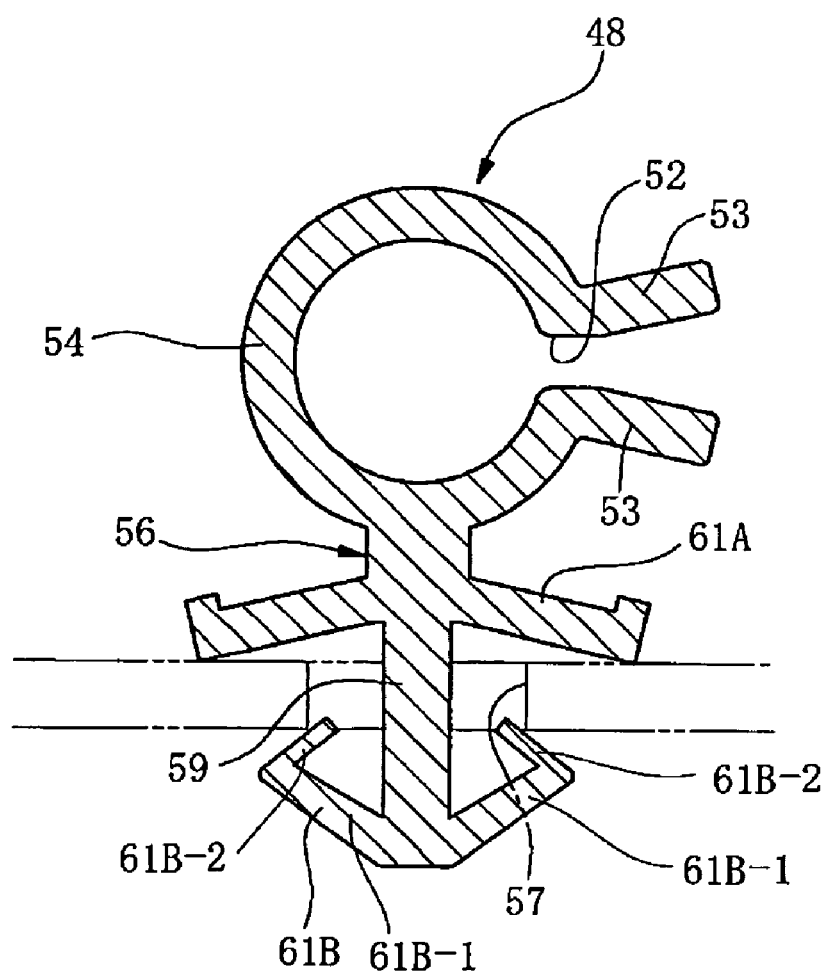
FIG. 5 is a view showing a fixing clamp according to the one embodiment of the present invention, before fastened.
Figure 6A:
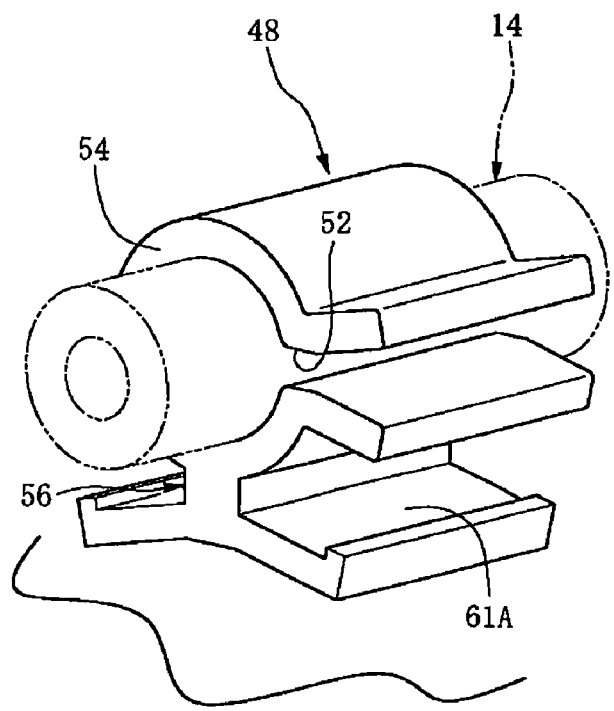
FIG. 6 (A) is a perspective view showing a state that the resin tube is fastened by the fixing clamp.
Figure 6B:
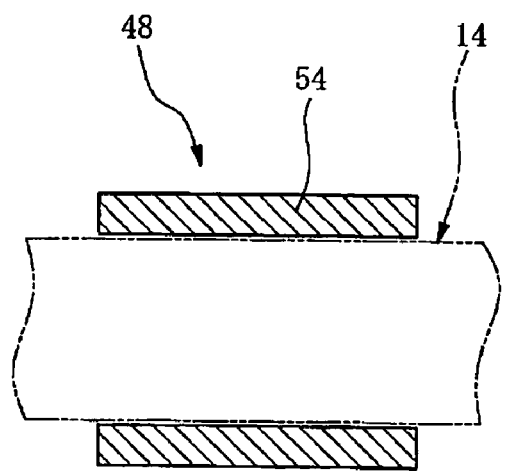
Figure 7A:
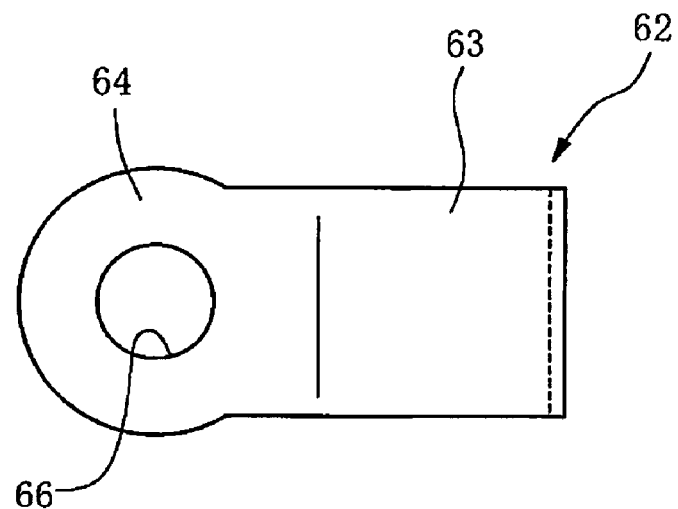
FIG. 7 (A) is a front view showing another mode of a fixing clamp.
Figure 7B:
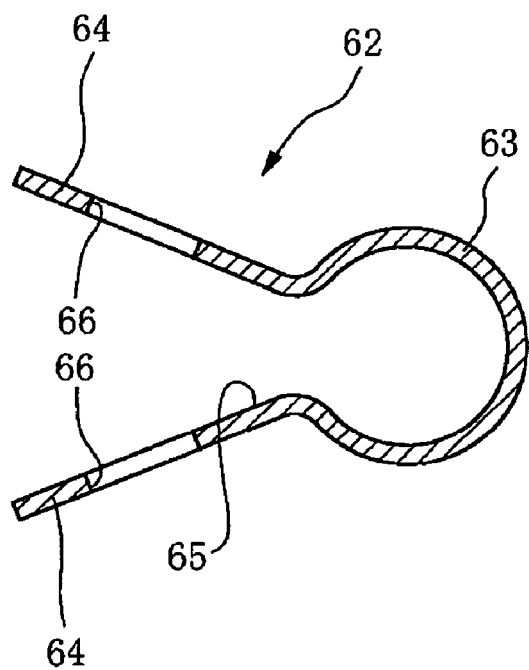
Figure 7C:
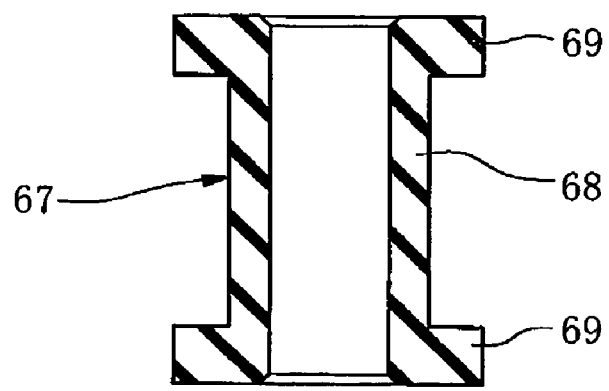
Figure 7D:
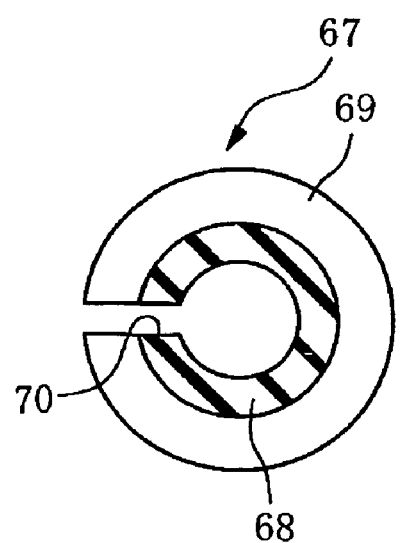
Figure 8A:
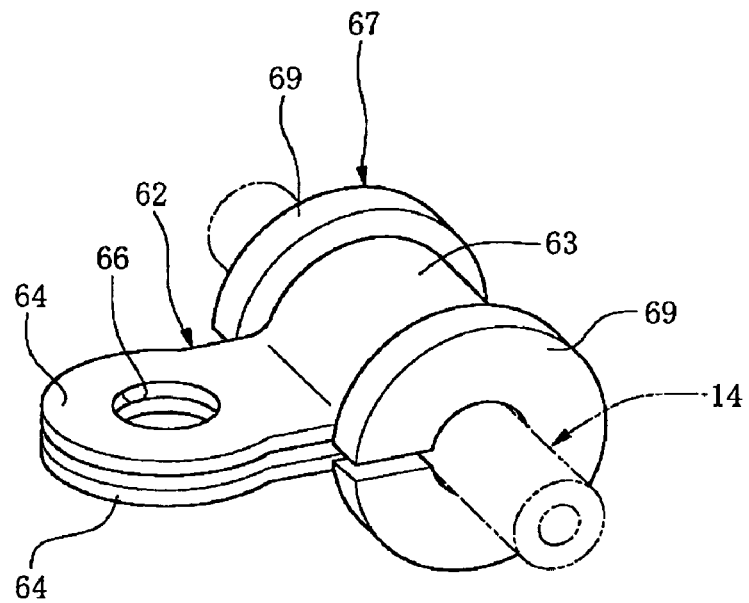
FIG. 8 (A) is a perspective view showing a state that the resin tube is fastened by the another mode of the fixing clamp.
Figure 8B:
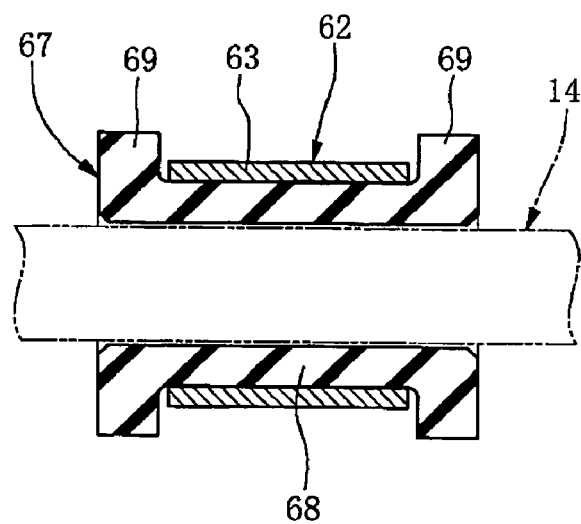
Figure 8C:
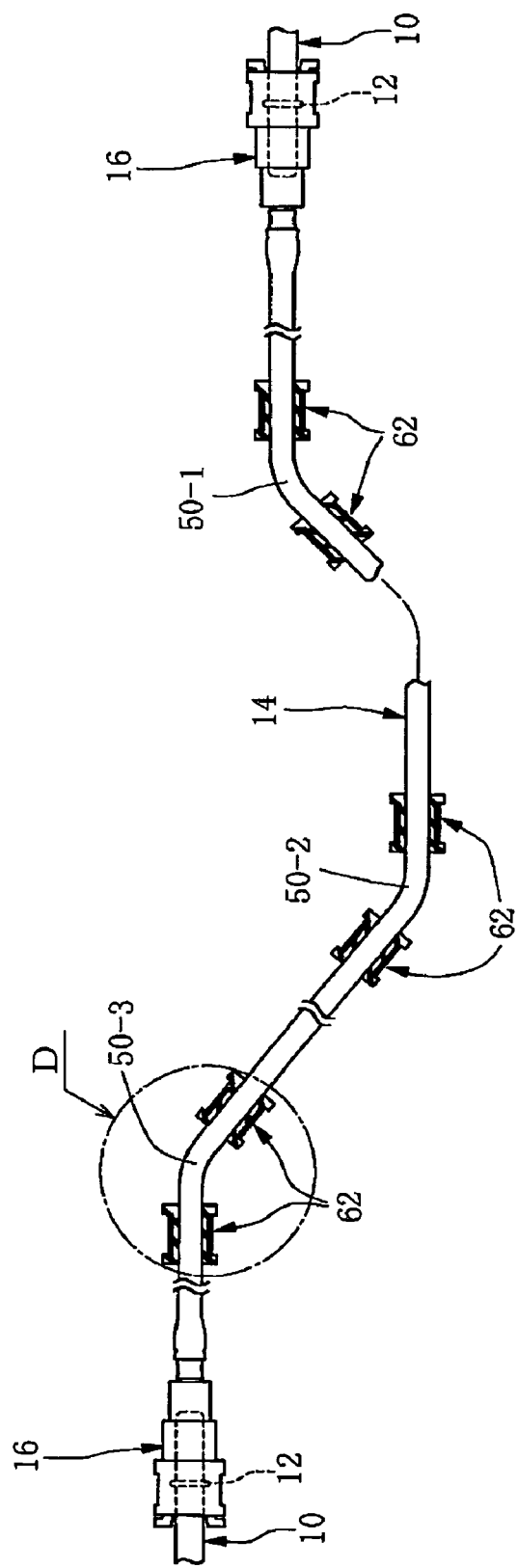
Figure 8D:
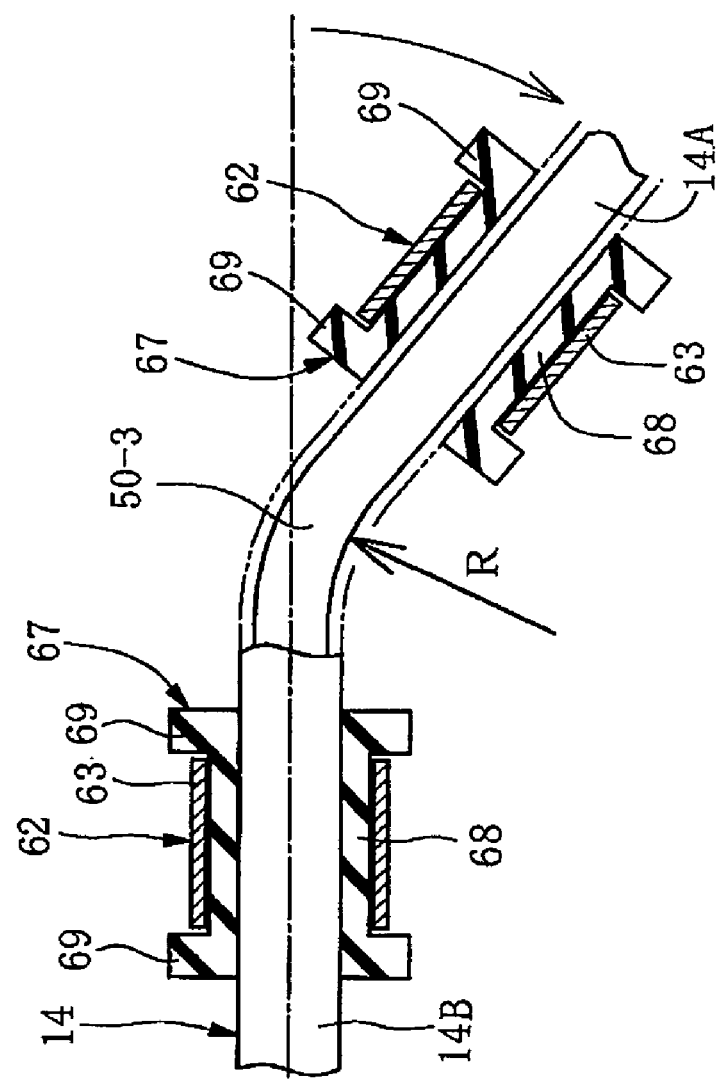

FIGS. 5 and 6 show a preferred embodiment of the fixing clamp.

Here, FIG. 5 shows the fixing clamp 48 before fixed to the motor vehicle body, while FIG. 6 shows the fixing clamp 48 after fixed thereto. Meanwhile, FIG. 1(A) shows the piping structure where the fixing clamp 48 is used.

In FIG. 5, the fixing clamp 48 is made of resin, and is flexible or resilient. The fixing clamp 48 has a holding portion 54 and a mounting portion 56. The holding portion 54 is formed in generally annular shape as a whole, and provided with an opening 52 in a predetermined circumferential position thereof. The holding portion 54 includes a pair of guide duck bill portions 53, 53 projecting outwardly, on both ends of the opening 52. Thereby the holding portion 54 is in a form of generally C-shape. The mounting portion 56 has an insert portion 59 for a holding bore 57 in a panel of a side of the motor vehicle body, and a pair of pinching portions 61A, 61B for pinching the panel from inside and outside the panel. The pinching portion 61A is formed integrally on an outer end portion of the mounting portion 56 or the insert portion 59 (an end portion of the mounting portion 56 or the insert portion 59 near the holding portion 54) so as to extend in both lateral directions (both laterally outward directions, in right and left directions in FIG. 5), while the pinching portion 61B is formed integrally on an inner end portion of the mounting portion 56 or the insert portion 59 (an end portion of the mounting portion 56 or the insert portion 59 opposite to the holding portion 54) so as to extend in the both lateral directions. The pinching portion 61-B integrally includes foot portion 61B-1 that extends laterally outwardly and is angled toward the holding portion 54 on both lateral sides, and turned-back portion 61B-2 that extends in laterally inward direction from laterally outer ends of the foot portion 61-B and is angled toward the holding portion 54. A distance between laterally outer ends of the pinching portion 61A is sufficiently greater than a width of the holding bore 57, and a distance between laterally outer ends of the pinching portion 61B (a distance between laterally outer ends of the foot portion 61B-1) is slightly greater than the width of the holding bore 57.

As shown in FIG. 6 (A), in the fixing clamp 48, the resin tube 14 is slipped in the holding portion 54 via the opening 52 in a direction perpendicular to an axis while resiliently widening the holding portion 54, and thereby the resin tube 14 is held by the holding portion 54. Then the fixing clamp 48 is securely fixed to the motor vehicle body in the holding bore 57, and thereby the resin tube 14 is in fixed relation to the motor vehicle body. The fixing clamp 48 is securely fixed thereto, for example, in a following manner. The insert portion 59 is inserted in the holding bore 57 of the panel such that the pinching portion 61B is force-fitted within the holding bore 57, for example, while being narrowed or deformed laterally inwardly, and until the pinching portion 61B completely or generally completely passes through the holding bore 57 on to a rear side of the panel. In this mounted state, laterally outer end portions of the pinching portion 61A engage with a surface of the panel, while the turned-back portion 61B-2 of the pinching portion 61 B engages with an edge or an inner edge of the holding bore 57. Accordingly, for example, the fixing clamp 48 is mounted stably in the panel. On the other hand, it is carried out smoothly to insert the fixing clamp 48 in the holding bore 57 and it is possible to pull the fixing clamp 48 out of the holding bore 57.

FIGS. 7 and 8 show another preferred embodiment of a fixing clamp or fixing clamp device. Here, FIG. 7 shows the fixing clamp or fixing clamp device before fixed in the motor vehicle body, while FIG. 8 shows the fixing clamp or fixing clamp device after fixed therein.

In FIG. 7, another fixing clamp 62 is made of metal, and has a holding portion 63 in a form of generally annular shape as a whole and a pair of mounting or fixing portions 64 in a form of plates that extend from both circumferential ends of the holding portion 63.

Each of the mounting portions 64 includes a mounting aperture 66. The mounting portions 64 are fastened to or securely fixed in the motor vehicle body by way of the mounting apertures 66. Here, in the state before clamped as shown in FIG. 7, the another fixing clamp 62 includes an opening 65 through which the resin tube 14 is fitted in the holding portion 63 in a direction perpendicular to an axis.

Reference numeral 67 indicates a buffer member made of an elastic material (here, made of rubber) that is interposed between the metal another fixing clamp 62 and the resin tube 14. The buffer member 67 includes a cylindrical portion 68, flange portions 69 on either end thereof, and a buffer member opening 70 in a predetermined circumferential position thereof.

That is, the buffer member 67 is in the form of C-shape as a whole.

In this fixing clamp device (the fixing clamp 62 and the buffer member 67), as shown in FIG. 8, the cylindrical portion 68 of the buffer member 67 is first fitted in the holding portion 63. In this sate, the resin tube 14 is inserted in the buffer member 67 via the opening 65 and the buffer member opening 70, and then, the another fixing clamp 62 is fastened to or securely fixed in the motor vehicle body at the mounting apertures 66. At that time, the another fixing clamp 62 securely fixes the resin tube 14 in the motor vehicle body with the opening 65 closed (refer to FIG. 8 , FIG. 8 (C) and FIG. 8 (D) show a state that the resin tube 14 is fastened to the motor vehicle body by the fixing clamp 62). Namely, the another fixing clamp 62 is securely fixed in the motor vehicle body such that the pair of mounting portions 64 are approached or contact each other to be joined together.

Alternatively, the resin tube 14 may be first fitted in the buffer member 67, and in this state the resin tube 14 with the buffer member 67 thereon may be inserted and held in the holding portion 63 of the another fixing clamp 62 via the opening 65 in the direction perpendicular to the axis.

Although the buffer member 67 is applied here, the resin tube 14 may be fitted directly in the another fixing clamp 62, and thereby the resin tube 14 may be securely fixed in the motor vehicle body. By the way, in FIG. 8 (C), the resin tube 14 that is not provided with a mark 88 is used. However, the resin tube 14 may be provided with the mark 88, at the front of the resin tube 14 in the figure, similarly to the one in FIG. 1 (A).

Figure 9:
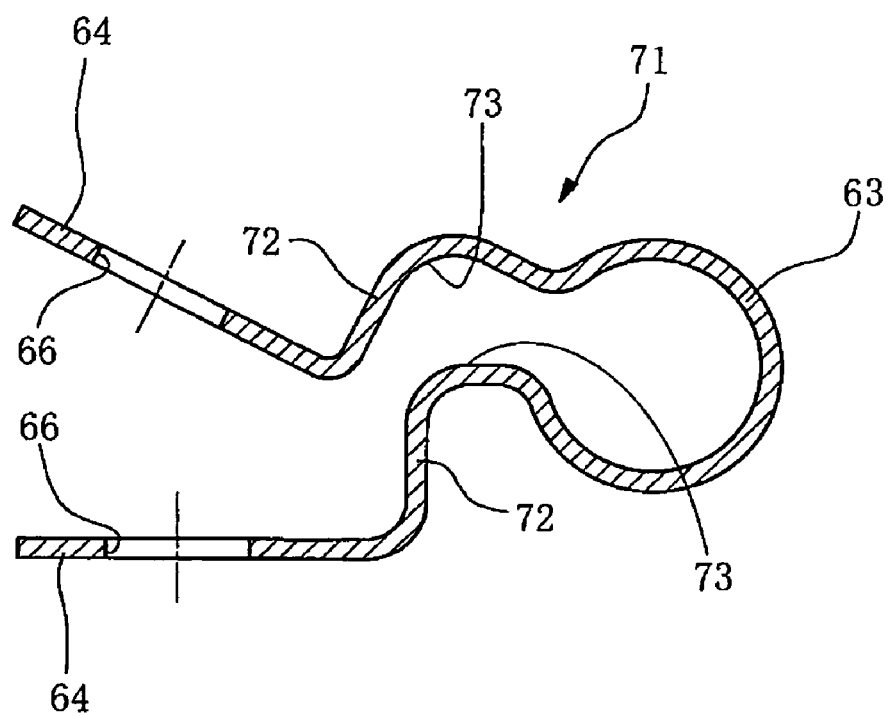
FIG. 9 is a view showing yet another mode of a fixing clamp.
Figure 10A:
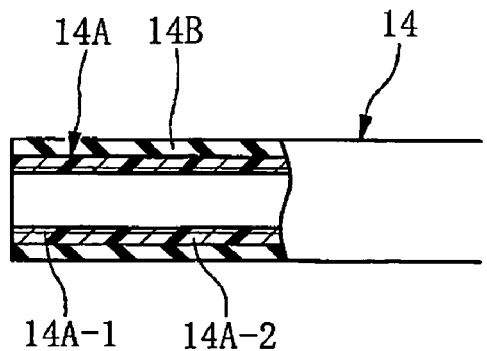
FIG. 10 (A) is a view showing a first step of a production process of the resin tube of the one embodiment.
Figure 10B:
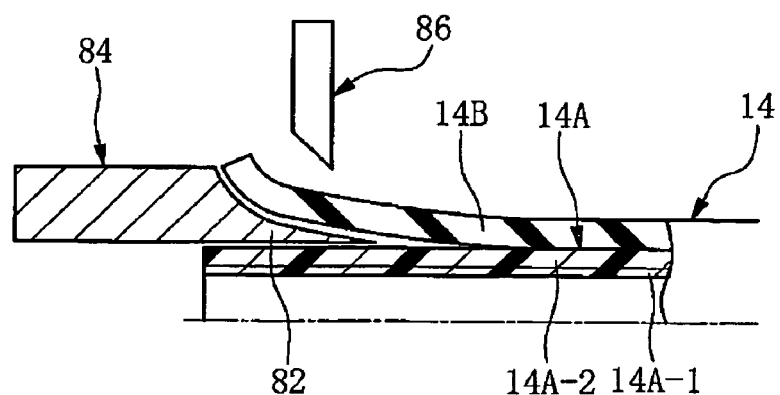
Figure 10C:
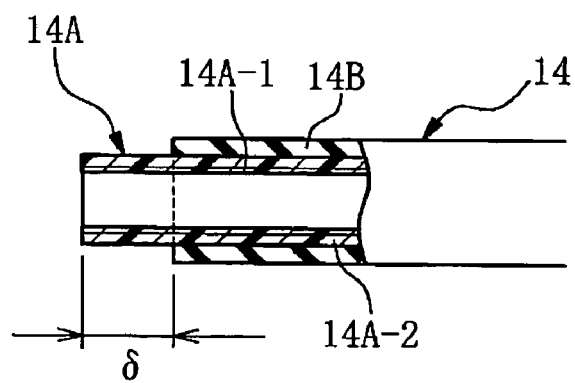
Figure 10D:
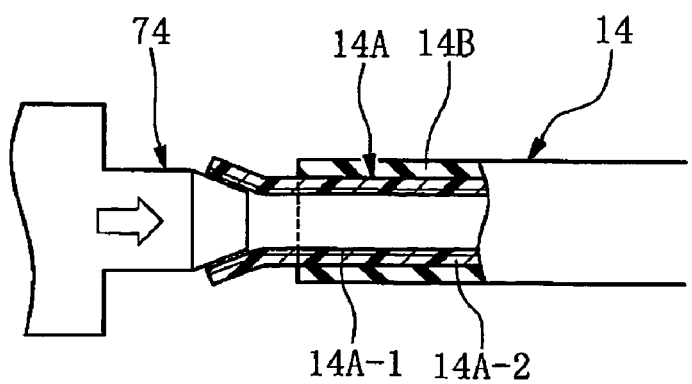
Figure 10E:
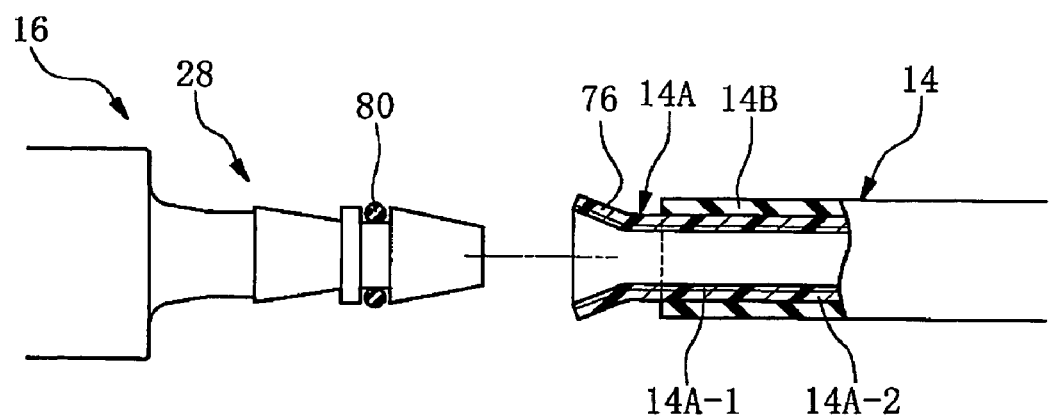

FIG. 9 shows yet another preferred embodiment of a fixing clamp.

Yet another fixing clamp 71 differs from the another fixing clamp 62 shown in FIGS. 7 and 8 in that the yet another fixing clamp 71 has raised portions (curved portions) 72 between an opening of the holding portion 63 and the mounting or fixing portions 64. For the rest, the yet another fixing clamp 71 has basically the same configuration as the another fixing clamp 62. In the yet another fixing clamp 71, a relatively long and curved opening 73 or an opening 73 is defined between the opening of the holding portion 63 and the mounting portions 64. When the fixing clamp 71 is deformed so as to join the mounting portions 64 together, both raised portions 72 are approached or contacted each other to be joined together, the opening of the holding portion 63 and the curved opening 73 are closed. Therefore, more stable retaining function is secured for the resin tube 14 when the fixing clamp 71 is fastened to or securely fixed in the motor vehicle body.

As stated above, according to the embodiment of the present invention, as there is no need to shape the resin tube 14 in a predetermined bent or curved shape in a manufacturing step, a cost related to the resin tube 14 may be lowered.

And, the resin tube 14 is in the form of a straight tubular shape until assembled in the motor vehicle body. The resin tube 14 is bent or curved in a required bent or curved shape just when assembled in the motor vehicle body in an assembling step. Therefore, there is no need to prepare varied types of the resin tubes 14 corresponding to types of motor vehicles or piping layouts, and a common type of the resin tube 14 may be used for various types of motor vehicles or various piping layouts.

And, according to this embodiment, both side regions of each of the bent points 50 (50-1, 50-2, 50-3) of the resin tube 14 are held and securely fixed in the motor vehicle body by fixing clamps 48, 62 (62 and 67) or 71. So, when vibration is transmitted to the resin tube 14 from the motor vehicle body, oscillation or vibration of the resin tube 14 may be restrained small, and restraining or clamping action of the fixing clamps 48, 62 (62 and 67) or 71 does not allow rotational movement of the resin tube 14 itself. That is, the connector 16 does not relatively rotate relative to the mating pipe 10. This may simultaneously solve the problem that the O-ring 22 in the connector 16 is worn and collapsed due to relative rotational movement of the resin tube 14 and thereby sealing property is lowered, and good sealing property between the connector 16 and the mating pipe 10 may be maintained for a long time.

In this embodiment, a small diameter tube is adapted for the resin tube 14, and the resin tube 14 is very flexible. Therefore, when the resin tube 14 is bent in an assembling step, it is hard to be broken (kinked). The resin tube 14 may be easily bent and deformed in a bent shape as desired and assembled in the motor vehicle body.

In the fixing clamps 48, 62, 71 of this embodiment, the resin tube 14 may be fitted in the C-shaped holding portions 54, 63 by resiliently opening or widening the C-shaped holding portions 54, 63. Therefore, an operator can easily fasten the resin tube 14 to the motor vehicle body by means of fixing clamps 48, 62, 71 while bending the resin tube 14 in an assembling site.

The fixing clamps 62 and 71 according to the present invention have openings 65, 73 before clamped, which are closed when fastened to or securely fixed in the motor vehicle body. This configuration may reduce or eliminate a clearance relative to the resin tube 14, and thereby favorably restrains the resin tube 14 from oscillation. Therefore, these clamps are preferable, but in the present invention, also adaptable are fixing clamps of varied configurations in addition to the fixing clamps 48, 62, 71 described above.

As stated above, FIG. 4 shows the resin tube 14 before assembled in the motor vehicle body. As understood from the figure, the resin tube 14 has a straight tubular shape before assembled. That is, the resin tube 14 is formed or molded in the form of the straight tubular shape by extrusion or the like. The resin tube 14 is equipped with the connectors 16 on both end portions of the resin tube 14 before assembled in the motor vehicle body, and the resin tube 14 with the connectors 16 thereon is assembled in the motor vehicle body.

The end portions of the resin tube 14 are expanded in a flared shape (flared out) before equipped with the connectors 16.

Flaring out of the end portion of the resin tube 14 permits the nipple portion 28 of the connector 16 to be force fitted favorably in the resin tube 14, specifically, the resin tube body 14A.

Figure 11A:
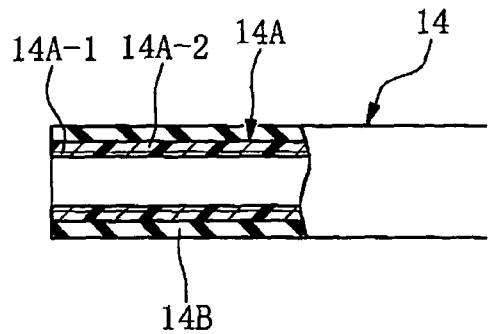
FIG. 11 (A) is a view showing a first step of a production method by way of comparison to the production process shown in FIG. 10.
Figure 11B:
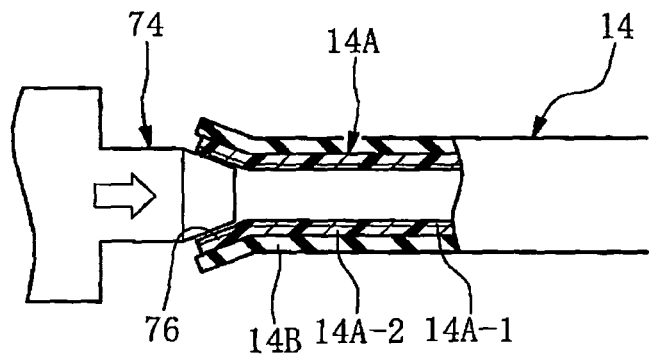
Figure 11C:
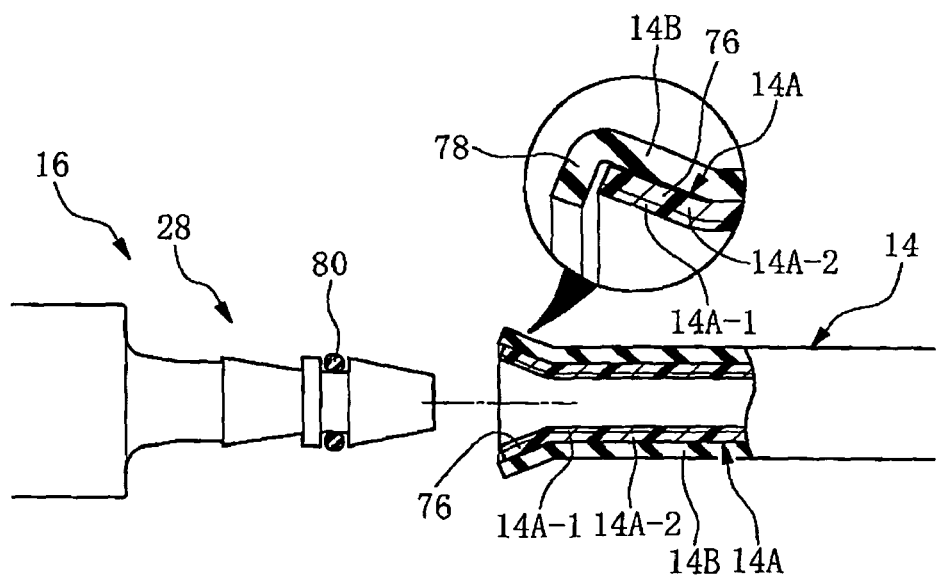
Figure 12A:
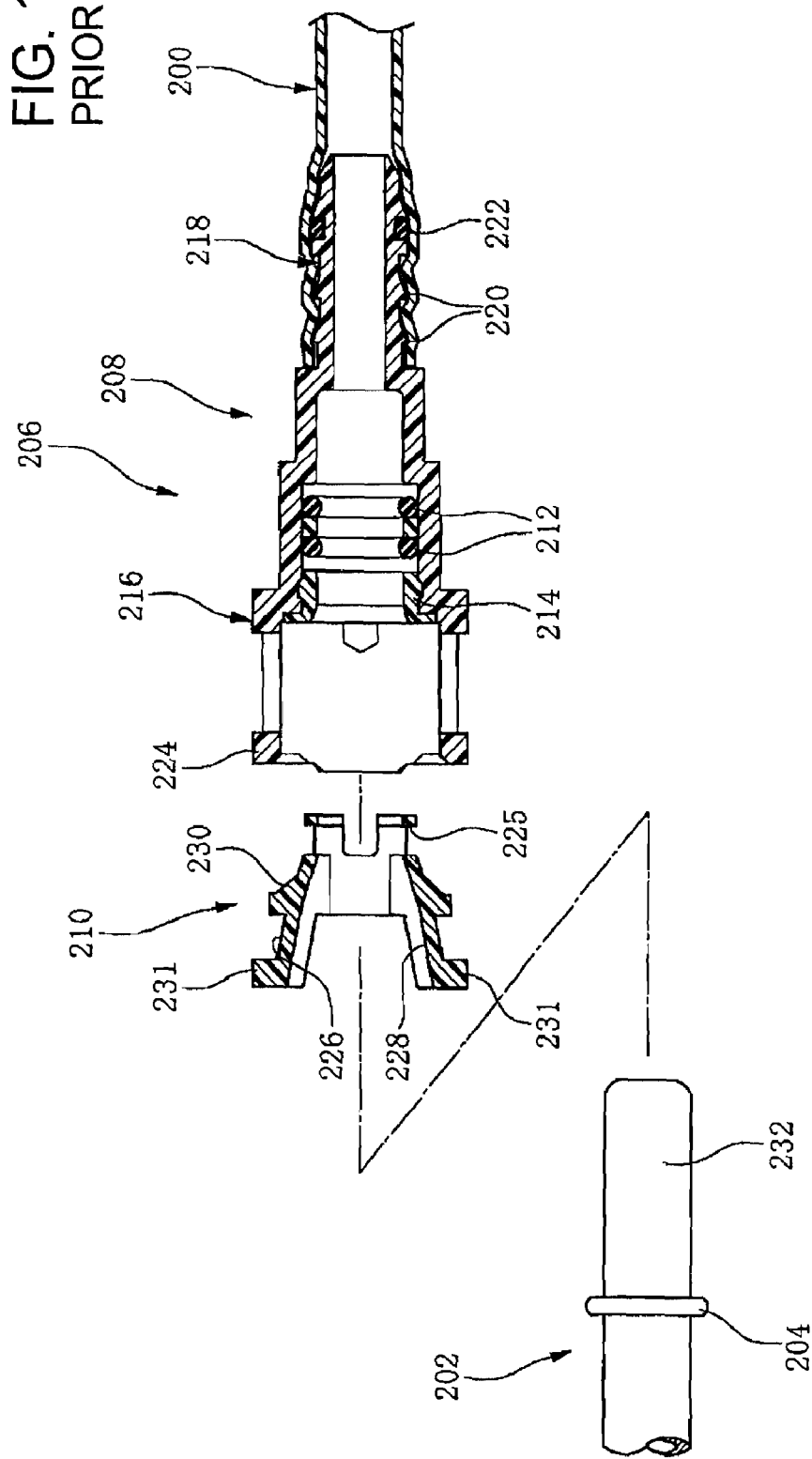
FIG. 12 (A) is an example of a conventional piping structure.
Figure 12B:
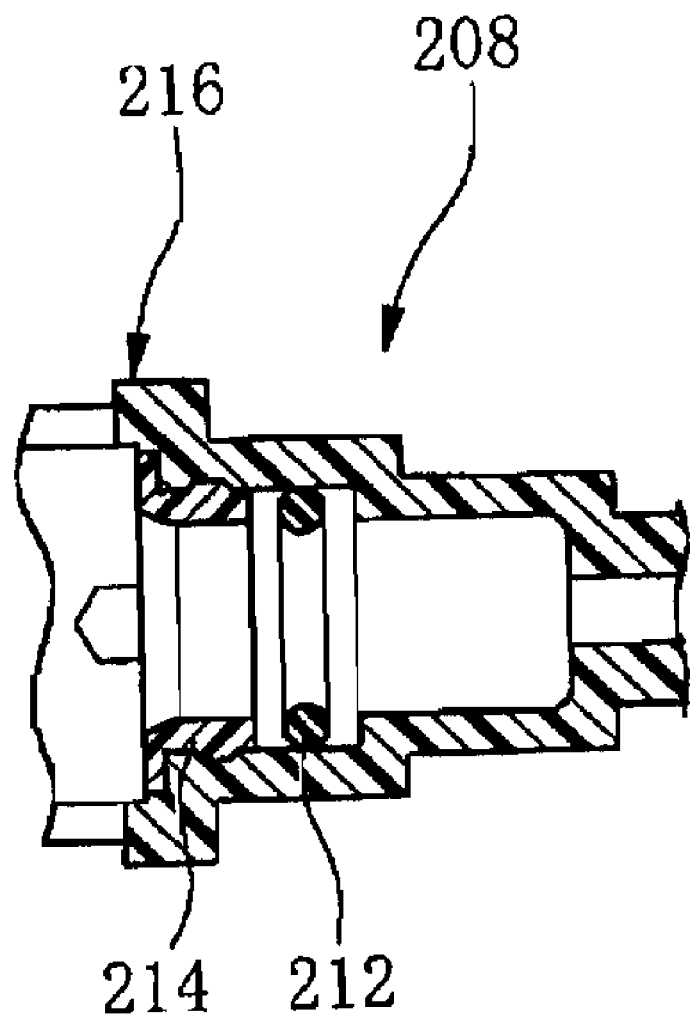
Figure 13A:
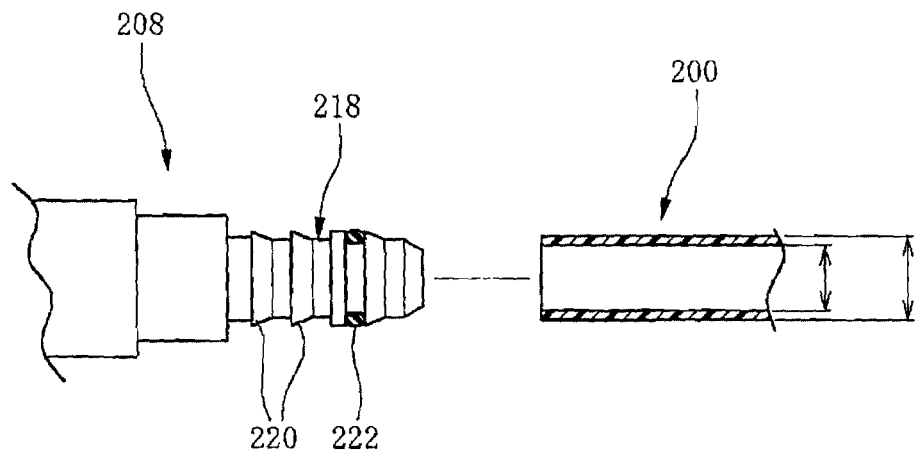
FIG. 13 (A) is a view of a relevant part of the connector of FIG. 12 along with a resin tube, and showing a state before the connector is force-fitted in the resin tube.
Figure 13B:
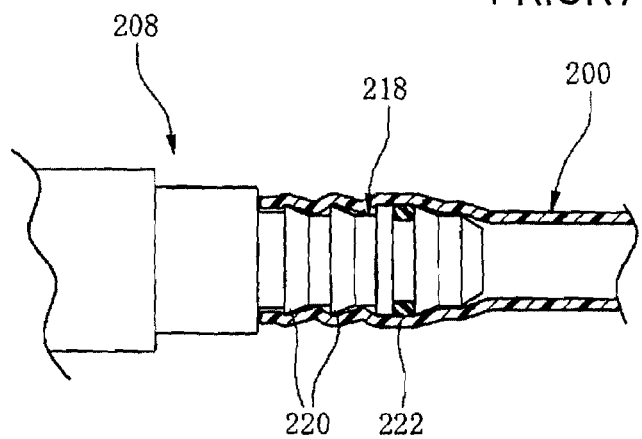
Figure 14A:
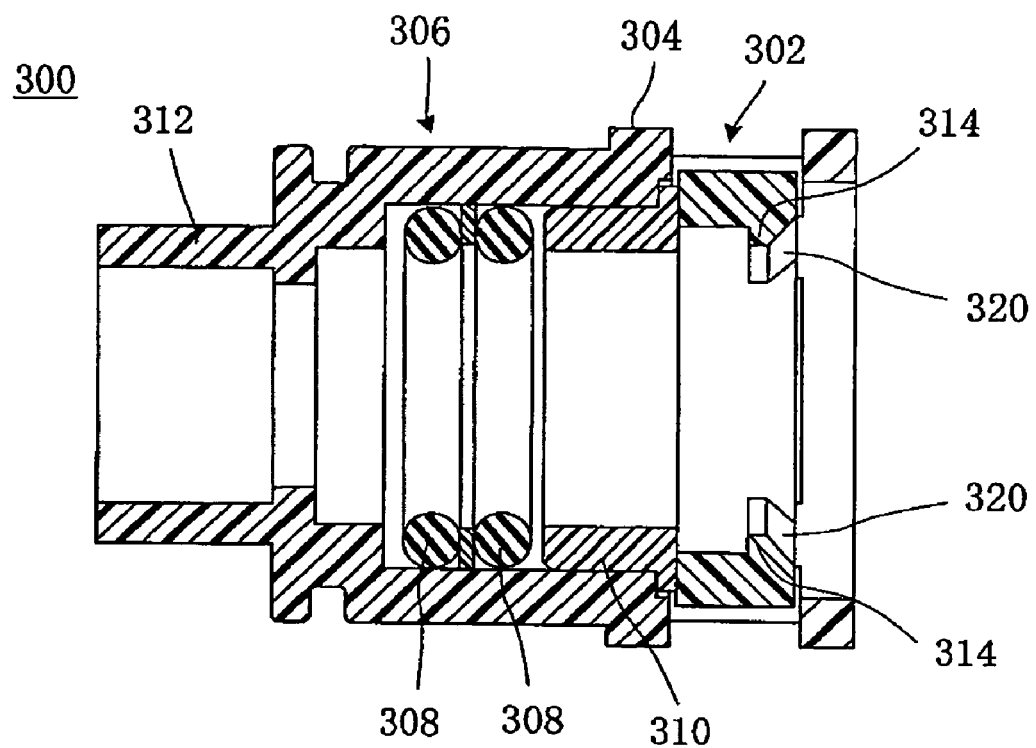
FIG. 14 (A) is a sectional view of another connector.
Figure 14B:
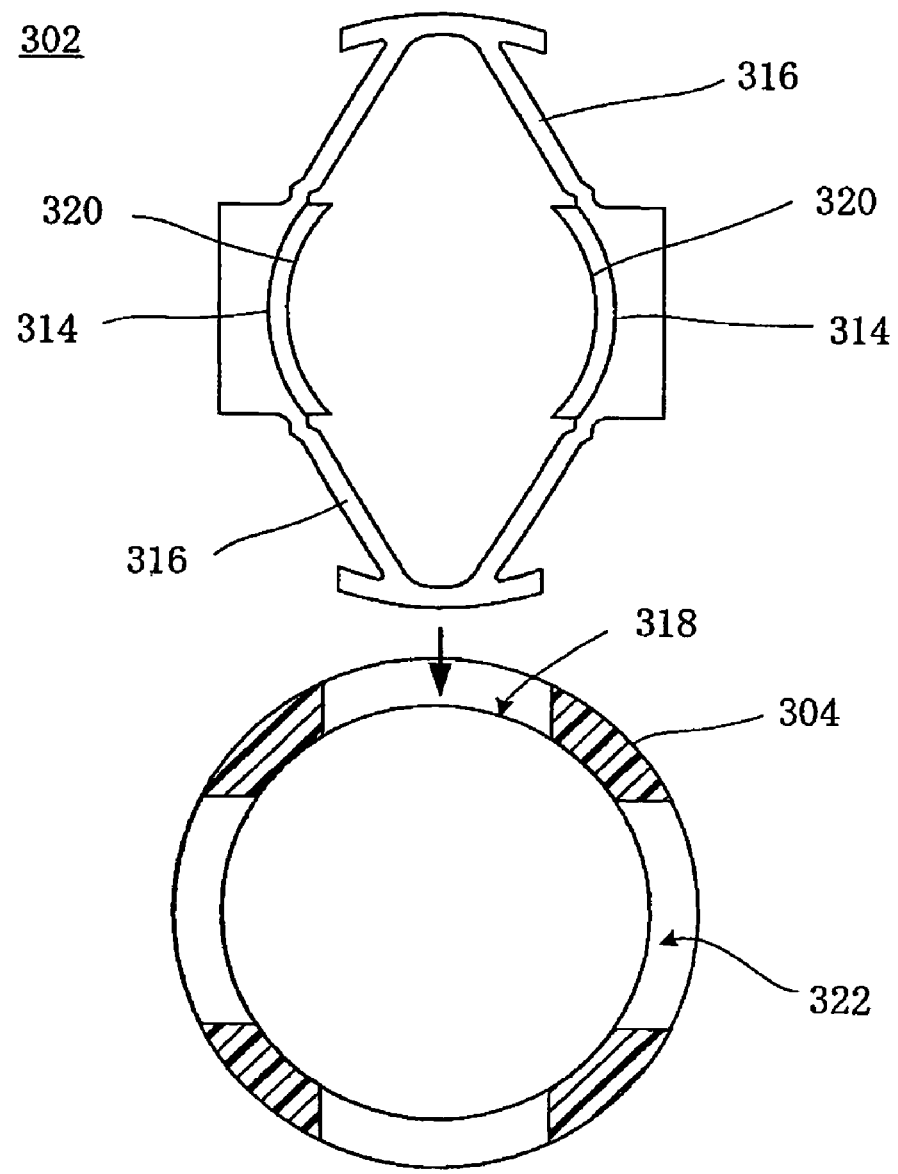
Figure 15:
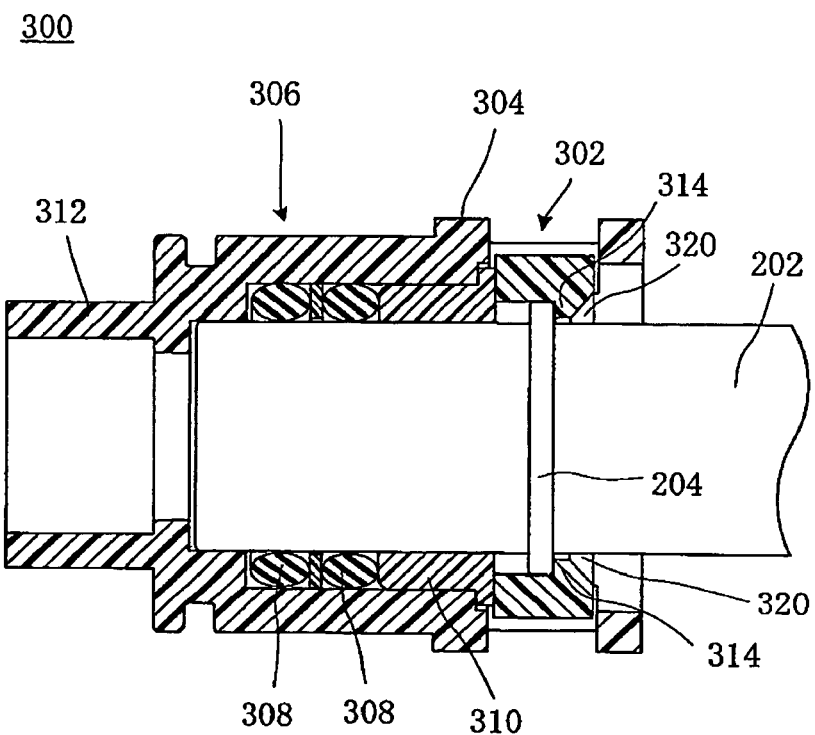
FIG. 15 is a sectional view showing a state that the another connector is connected to the mating pipe.

At that time, as shown in FIG. 11 of a comparison example, if the clamped layer 14B is laminated to cover the resin tube body 14A up to a terminal end of the resin tube body 14A (refer to FIG. 11 (A)), as shown in FIG. 11 (B), when a flaring jig 74 is inserted inside the resin tube body 14A to flare an end portion thereof, a flared portion 76 or a flared portion 76 of the resin tube body 14A contracts under a pressure exerted in an axial direction and so on, an end portion of the clamped layer 14B overlies an end surface of the flared portion 76 as well shown in a fragmentary enlarged view of FIG. 11 (C). That is, an overlying portion 78 is defined. As the case may be, a leading end of the overlying portion 78 extends or protrudes beyond an inner surface of the terminal end of the flared portion 76 towards an axis.

Therefore, when the nipple portion 28 of the connector 16 is force fitted in the resin tube body 14A in this state as shown in FIG. 11 (C), there is a fear that the overlying portion 78 scratches an O-ring 80 that is fitted on an outer peripheral surface of the nipple portion 28, or the overlying portion 78 is caught in or jammed by the nipple portion 28 and sealing property of the O-ring 80 is lowered.

According to this embodiment, before the connector 16 is force fitted in and equipped to the resin tube 14, the clamped layer 14B is first laminated on the resin tube body 14A so as to cover an entire length of the resin tube body 14A, from one end to the other end thereof (a first step), as shown in FIG. 10 (A). Then, as shown in FIGS. 10 (B) and (C), the terminal end portion of the clamped layer 14B is cut and removed for predetermined length.

Specifically, as understood from FIG. 10 (B), a cylindrical cutting guard 84 that has a convergent end portion 82 is slid into between the resin tube body 14A and the clamped layer 14B for a certain axial length from the axial end of the resin tube 14 to protect or guard the resin tube body 14A (a second step). Then, while protecting the resin tube body 14A by the cutting guard 84, a cutting blade 86 is applied onto an outer peripheral surface of the clamped layer 14B, and the resin tube 14 and the cutting blade 86 are rotated relatively so that an annular end part or portion of the clamped layer 14B is cut by the cutting blade 86 and removed from on the resin tube body 14A (a third step).

Relative rotation may be caused by rotating either the resin tube 14 or the cutting blade 86. However, it bothers an operator to rotate the lengthy resin tube 14. So, it is preferred to rotate the cutting blade 86 because cutting is easily applicable for the resin tube 14 of any length.

In this manner, an end portion of the resin tube body 14A is exposed along a predetermined length δ thereof as shown in FIG. 10 (C).

After that, a shown in FIG. 10 (D), the end portion of the resin tube body 14A is flared and expanded radially outwardly by the flaring jig 74 (a fourth step).

In this state, as shown in FIG. 10 (E), the nipple portion 28 of the connector 16 is force fitted in the resin tube body 14A, and the connector 16 is attached to an end portion of the resin tube 14 (a fifth step).

During that time, as the end portion of the clamped layer 14B does not overlies an end surface of the flared portion 76, namely the overlying portion 78 as shown in FIG. 11 (C) is not defined, the O-ring 80 is not scratched when the nipple portion 28 is force fitted in the resin tube body 14A. And, there occurs no problem that the overlying portion 78 is caught in or jammed by the O-ring 80, etc. and sealing property of the O-ring 80 is lowered.

According to this embodiment of the present invention, when the resin tube 14 is clamped by the fixing clamps 48, 62, 71, the clamped layer 14B laminated on the outer peripheral surface of the resin tube body 14A effectively prevents the resin tube body 14A from being scratched. Accordingly, it is allowed to favorably assemble the resin tube 14 in the motor vehicle body by clamping the resin tube 14 with the fixing clamps 48, 62, 71.

And, in this embodiment, the clamped layer 14B is provided on the resin tube body 14A and along substantially an entire length of the resin tube body 14A. So, the resin tube body 14A may be effectively prevented from being scratched when the resin tube 14 is clamped at any points thereof by the fixing clamps 48, 62, 71.

That means, according to this embodiment, the resin tube 14 may be clamped at any points thereof along an axial direction by the fixing clamps 48, 62, 71 without damaging the resin tube body 14A. Therefore, the resin tube 14 may be assembled in the motor vehicle body while shaping the resin tube 14 in various bent shapes.

In this embodiment, the end portion of the clamped layer 14B is removed for a predetermined length δ from either end of the clamped layer 14B or the resin tube body 14A so that either end portion of the resin tube body 14A is exposed. So, the overlying portion 78 of the clamped layer 14B is not defined when a terminal end or the end portion of the resin tube body 14A is flared. This solves the problem that when the nipple portion 28 of the connector 16 is force fitted inside the resin tube body 14A, the O-ring 80 fitted on an outer peripheral surface of the nipple portion 28 is damaged, or the overlying portion 78 is caught in or jammed by the O-ring 80 or the like and thereby a sealing property is lowered.

According to the method for producing the resin tube 14 of this embodiment, first, the clamped layer 14B is laminated so as to cover the resin tube body 14A along an entire length from one end to the other end thereof, then, the cylindrical cutting guards 84 are slid between the resin tube body 14A and the clamped layer 14B from either longitudinal end thereof, respectively, end portions of the clamped layer 14B are annularly cut by the cutting blade 86, while protecting the resin tube body 14A by the cutting guards 84 and removed. In this manner, both annular end portions of the clamped layer 14B of a predetermined length may be removed favorably from an outer peripheral surface of the resin tube body 14A without damaging the resin tube body 14A.

Meanwhile, in this embodiment, a mark 88 is provided on an outer peripheral surface of the resin tube 14, specifically on an outer peripheral surface of the clamped layer (protective layer) 14B, linearly in a longitudinal direction of the resin tube 14 in a state that the resin tube 14 extends straight as shown in FIG. 4 (C).

In this embodiment, the mark 88 is configured by arranging letters, numbers and transverse lines. Needless to say, the mark 88 may be configured by arranging other letters, numbers and other symbols linearly. The mark 88 is provided, for example, on the outer peripheral surface of the resin tube 14, so as to have a width in a range of one-twentieth to one-fifth of an outer perimeter of the resin tube 14 (for example, in a range of one-fourteenth to one tenth of the outer perimeter of the resin tube 14). For example, when the resin tube 14 has an outer diameter of 6 mm, the mark 88 may have a height in a range of about 0.9 mm to about 3.8 mm (for example, in a range of about 1.3 mm to about 1.9 mm). Here, for example, the mark 88 is designed to have a height of 1.5 mm. The mark 88 is not necessary to have a width in a range of one-twentieth to one-fifth of a circumference of the resin tube 14 (for example, in a range of one-fourteenth to one-tenth of the circumference of the resin tube 14) along an entire length thereof, but the mark 88 is sufficient to have such width on a major part thereof, or on a major part thereof along the longitudinal direction thereof. In this configuration, the mark 88 has a proper width, and thereby kink preventive effect may be improved.

The resin tube 14 in a form of straight tubular shape shown in FIG. 4 (A) is entirely provided with a predetermined bent shape when assembled in the motor vehicle body as shown in FIG. 1.

During assembling, the resin tube 14 is bent or deformed in a bent shape without producing kinks in the marks 88 about an axis of the resin tube 14 and is fastened to or securely fixed in the motor vehicle body by the fixing clamps 48, 62, 71.

In the embodiment as stated above, when the resin tube 14 is kinked during assembling in the motor vehicle body, kinks are produced in the mark 88 arranged linearly as well as in the resin tube 14 itself. Therefore, an operator can easily and visually verify by the mark 88 that kinks are produced in the resin tube 14.

So, according to this embodiment, the resin tube 14 should be arranged and assembled in the motor vehicle body so as to maintain a linear arrangement of the mark 88. In this manner, an operator can arrange and assemble the resin tube 14 without producing kinks in the resin tube 14.

That means, it may be prevented that a high stress is generated in kinked portions of the resin tube 14, and deterioration of the resin tube 14 is progresses by the stress. Further, it also may be prevented that due to the kinks of the resin tube 14, the sealing member such as O-ring 22 of the connector 16 partially contacts the mating pipe 10 and thereby sealing property is lowered.

Figure 16:
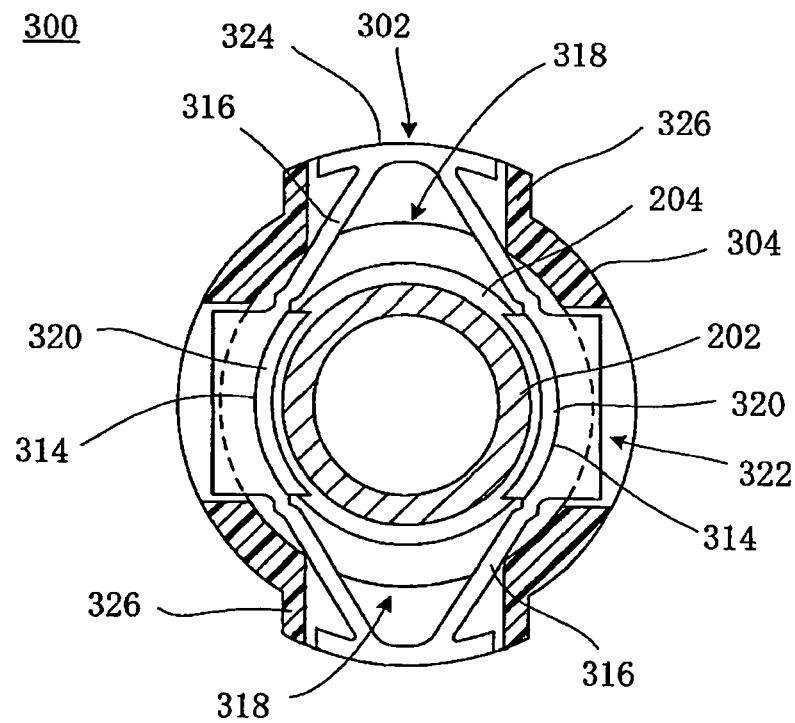
FIG. 16 is a view showing a modified example of the another connector.
Figure 17:
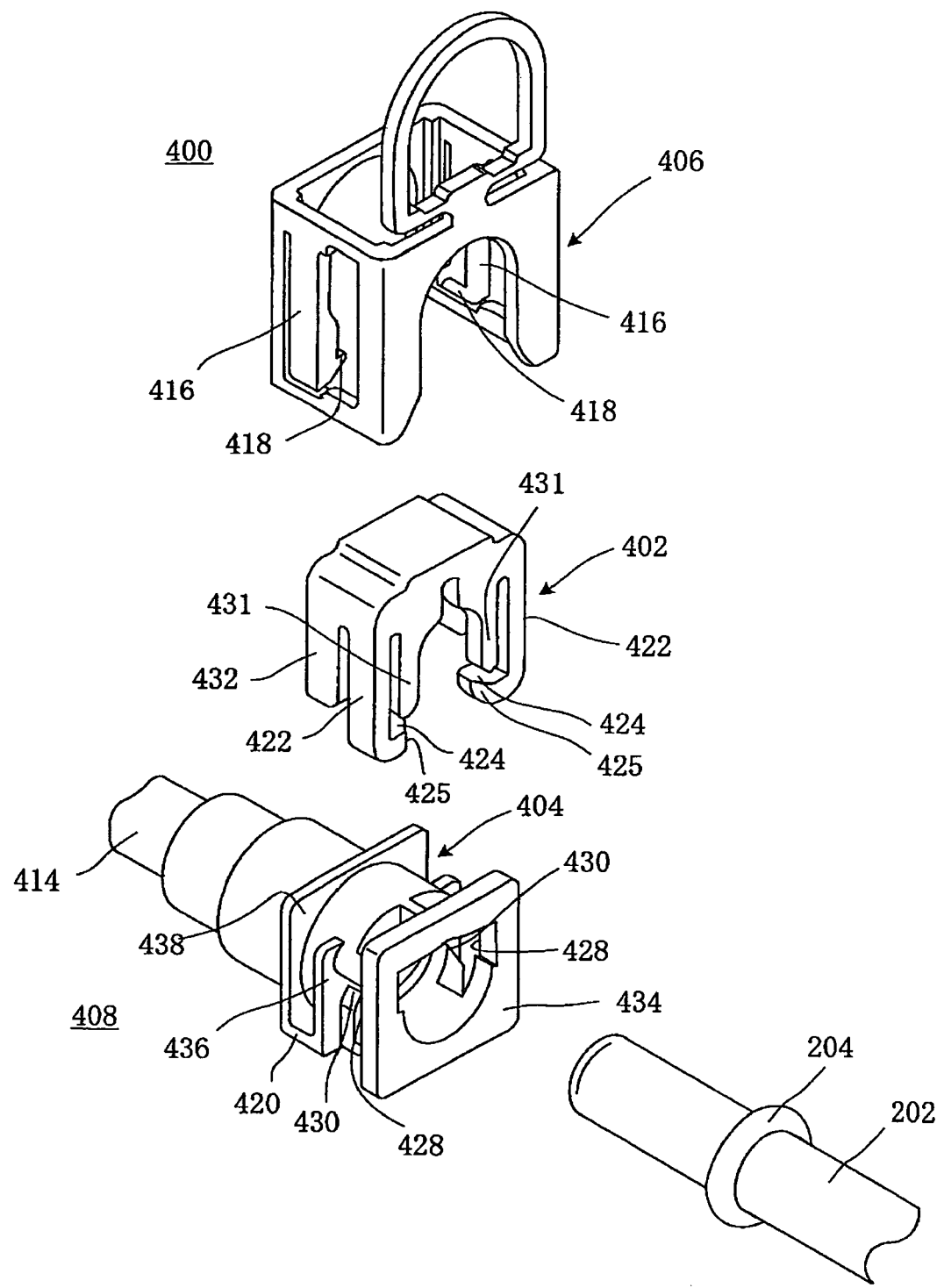
FIG. 17 is an exploded perspective view of yet another connector.

Meanwhile, for example, when the connector 300 (the retainer 302 is unitary incorporated in the retainer holding portion 304) is adapted in the embodiment of the present invention, the mark 88 is preferably provided on the resin tube 14 so as to correspond to one or the other press portion 324 (an operating direction of one or the other press portion 324), or so as to conform or generally conform to the one or the other press portion 324 relative to a circumferential position. With this configuration, in case that an operator is hard to visually find the operating portion (press portion 324), for example, the operating portion is housed in the connector body 306 (refer to FIG. 16), and the connector 300 is located in a region where parts and components are closely arranged, the operator can find the operating portion with a clue of the mark 88 that is arranged on the resin tube 14 so as to correspond to the operating portion.

Figure 18A:
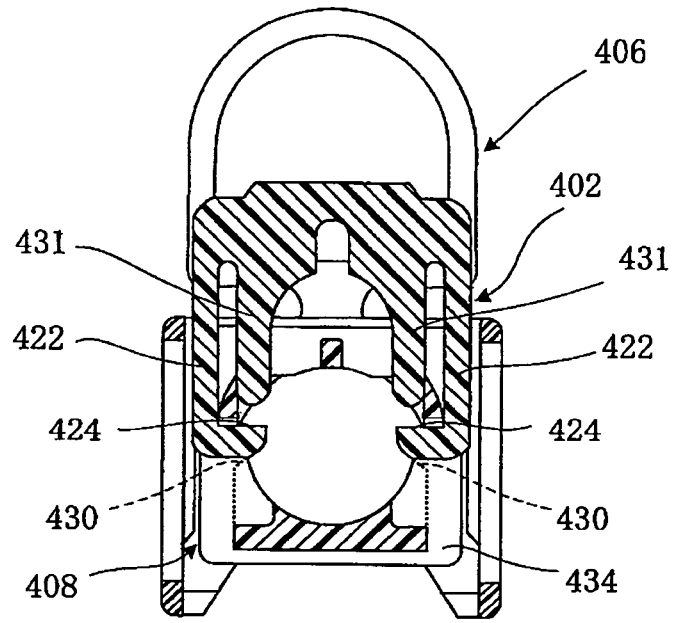
FIG. 18 (A) is a sectional view of the yet another connector.
Figure 18B:
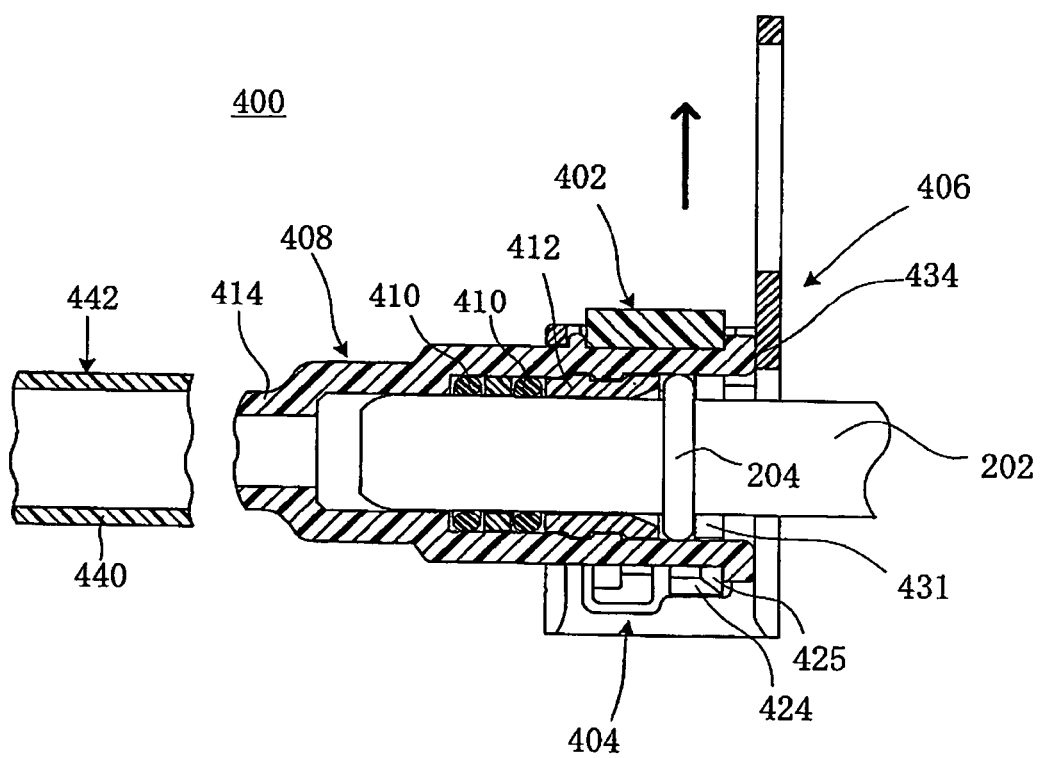
Figure 19:
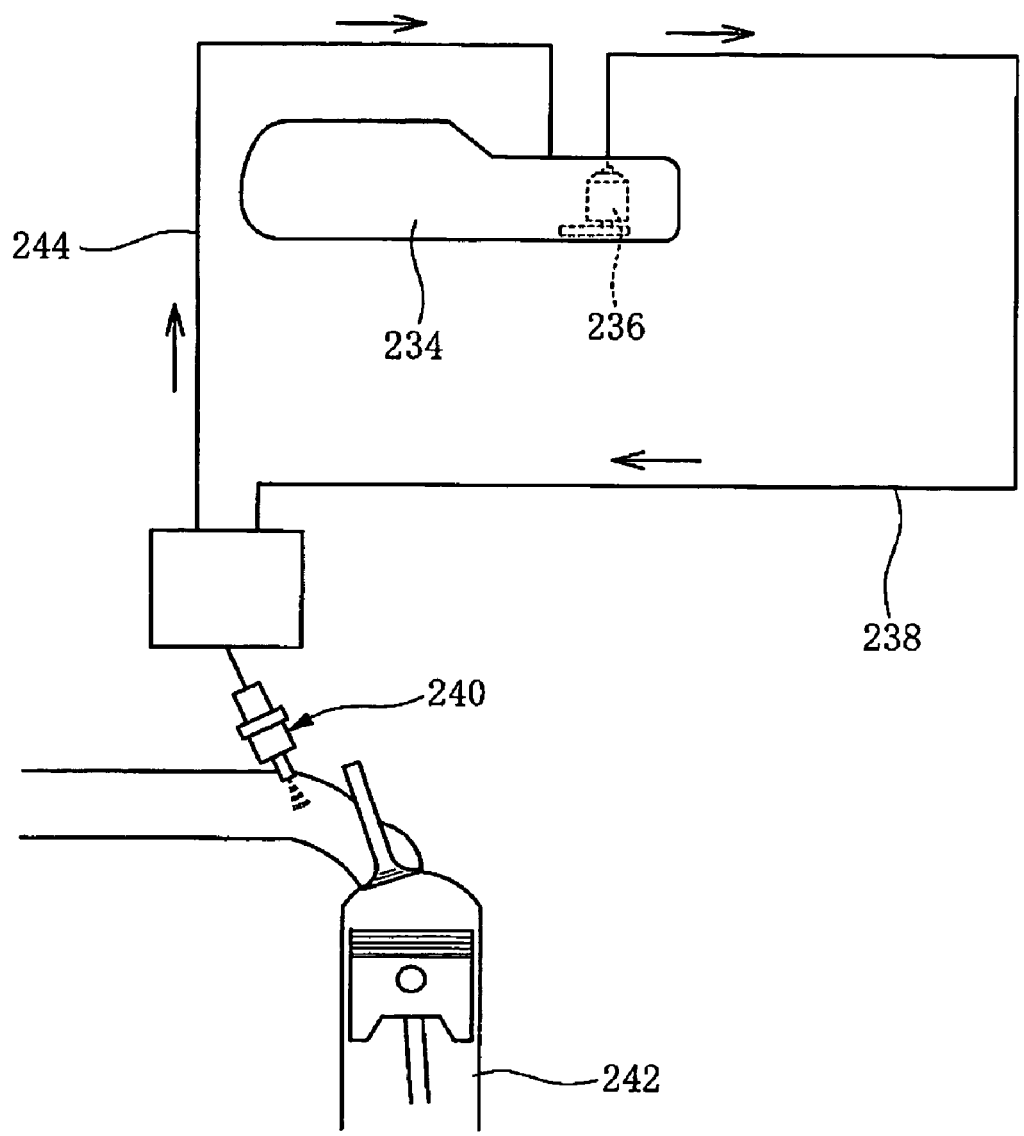
FIG. 19 is a schematic view of a return fuel system.

When the connector 16 is adapted, as shown in FIG. 4 (D), the checker member 90 may be mounted or installed on the retainer holding portion 26 for verifying complete connection between the connector 16 and the mating pipe 10. The checker member 90 is constructed in a following manner. The checker member 90 is mounted or installed on the retainer holding portion 26 such that stop claws 94 of resilient arms 92 enter in the opening windows 30 of the retainer holding portion 26 while engaging with circumferential edge portions 96 of the opening windows 30 (in a mounted state, the stop claws 94 enter inside the engaging recessed portions or engaging slit portions 34 of the retainer 20). When the mating pipe 10 is inserted within the retainer 20, and connected to the connector body 18 correctly, the engaging projection 12 pushes the stop claws 94 radially outwardly, engagement of the stop claws 94 with the opening windows 30 is cancelled. And, the checker member 90 may be removed from the connector 16 by pulling in a direction indicated by an arrow (in a direction perpendicular to a planar portion 98 between the opening windows 30 of the retainer holding portion 26). So, complete connection between the mating pipe 10 and the connector 16 may be verified by removing the checker member 90. In this case, the mark 88 may be provided on the resin tube 14 so as to correspond to a removing (a mounting and removing) direction of the checker member 90, or a removing (a mounting and removing) side of the checker member 90 (in case shown in FIG. 4 (D)) relative to a circumferential position. Namely, the mark 88 may be provided on the resin tube 14 so as to be located between the opening windows 30 relative to a circumferential position. Or the mark 88 may be provided on the resin tube 14 so as to conform to or generally conform to between the opening windows 30 or the planar portion 98 relative to a circumferential position, and at a side where the checker 90 is mounted. Further, the mark 88 may be provided on the resin tube 14 so as to correspond to a diametrically opposite side or diametrically symmetrical side to the removing (the mounting and removing) direction of the checker 90, or the removing (the mounting and removing) side of the checker member 90 relative to a circumferential position ( at 180° opposite to the position shown in FIG. 4 (D)). In this construction, an operator can arrange the resin tube 14 such that the checker member 90 is arranged in such orientation as to allow him/her to remove the checker 90 from the connector 16 by checking the mark 88. Or, for example, when the connector 400 (when the mating pipe 202 is completely inserted in the connector 400, the retainer 402 is allowed to be pushed relative to the retainer holding portion 404) is adapted in the embodiment of the present invention, the mark 88 is similarly provided on the resin tube 14 on the basis of a removing direction or a removing side of the checker member 406. For example, with reference to FIG. 18 (B) just for the sake of convenience, the checker member 406 is removed in a direction indicated by an arrow. The mark 88 may be provided on the resin tube 440 so as to correspond to this removing direction (the removing side or the mounting and removing side) relative to a circumferential position (refer to a circumferential position indicated by reference numeral 442). Meanwhile, a position corresponding to diametrically symmetrical position of the removing direction (the removing side or the mounting and removing side) of the checker member 406 relative to a circumferential position is a circumferential position 180° opposite to the circumferential position indicated by reference numeral 442 (lower position in the figure).

Although the preferred embodiments have been described above, these are only some of embodiments of the present invention.

For example, the marks 88 may take various forms other than the above. Or, as the case may be, it is possible to adapt the present invention to a resin tube having an outer diameter greater than 6 mm. Further, a connector, which has a retainer that is deformable resiliently in a radial direction, may be adapted for being attached to each of both end portions or one of the both end portions of the resin tube 14. The retainer may be configured separately from, unitary with or integrally with a connector body. In the connector that is used in embodiments according to the present invention, when the mating pipe 10 is inserted in the connector body, the retainer is pushed by the engaging projection 12 of the mating pipe 10, is deformed once in a radial direction (for example, deformed so as to expand in the radial direction), then is returned resiliently to its original shape to engage with the engaging projection 12 of the mating pipe 10. As a result, the connector body is securely fixed with the mating pipe 10 in an axial direction. When the connector 300 or the connector 400 is adapted, the connecting portion 312 or the connecting portion 414 is configured suitably to be fitted in the resin tube 14 (for example, as a force-fit portion).

As stated, the present invention may be constructed and embodied in various configurations and modes within the scope of the present invention.

What is claimed is:

1. A piping structure for transporting a fuel, arranged between an engine and a fuel tank, comprising:
    a resin tube formed in a straight tubular shape, for transporting a fuel, the resin tube being flexed and bent at one or more points along a longitudinal direction of the resin tube to define one or more bent portions and thereby being provided with a predetermined bent shape,
    a fixing clamp for fixing the resin tube in a motor vehicle body so as to retain the one or more bent portions and thereby assembling the resin tube in the motor vehicle body, and
    a connector attached to an end portion of the resin tube for connecting the resin tube with a mating pipe, wherein the resin tube is adapted to be assembled in the motor vehicle body while the tube is connected with the mating pipe via the connector, wherein the fixing clamp retains the one or more bent portions of the resin tube by fixing a region on each side of the one or more bent portions of the resin tube in the motor vehicle body, wherein the fixing clamp has a resilient holding portion of generally annular shape, and an opening through which the resin tube is adapted to be fitted in the holding portion in a direction perpendicular to an axis while resiliently widening the opening, the fixing clamp is constructed such that the opening is closed when the fixing clamp is fixed in the motor vehicle body while holding the resin tube in the holding portion.

2. The piping structure for transporting a fuel as set forth in claim 1, wherein the resin tube has a small outer diameter up to 6 mm.

3. The piping structure for transporting a fuel as set forth in claim 2, wherein the engine is connected to a rear wheel so as to fluctuate along with the rear wheel.

4. The piping structure for transporting a fuel as set forth in claim 1, wherein the mating pipe is integrally formed in a component that is securely fixed in the motor vehicle body.

5. The piping structure for transporting a fuel as set forth in claim 1 wherein the connector has;

a) a connector body in a form of a cylindrical shape as a whole, including a retainer holding portion on one end of the connector body along an axial direction and a connecting portion on the other end of the connector body for being connected to the resin tube, b) a retainer held in or on the retainer holding portion for engaging with a pipe side engaging portion in a form of a projection or recess on an outer peripheral surface of the mating pipe, and at a position spaced apart from an axial end of an inserting end portion of the mating pipe, c) a sealing member placed inside the other end of the connector body relative to the retainer holding portion, wherein the retainer securely fixes the mating pipe that is inserted in the connector body in an axial direction, the sealing member contacts with an outer peripheral surface of the inserting end portion of the mating pipe that is inserted in the connector body to provide a seal relative to the inserting end portion thereof.

6. The piping structure for transporting a fuel as set forth in claim 5 wherein the retainer holding portion is in a form of a socket shape, and the connecting portion is configured as a force-fit portion to be force fitted inside the resin tube.

7. The piping structure for transporting a fuel as set forth in claim 1 wherein the bent portion has an arcuate shape, and a pressure is exerted on the fixing clamp arranged on the region of each side of the bent portion by the resin tube in a direction of flattening the bent portion.

* * * * *